United States Patent
Ryu et al.

(10) Patent No.: US 11,341,882 B2
(45) Date of Patent: May 24, 2022

(54) ELECTRONIC DEVICE, METHOD, AND COMPUTER READABLE MEDIUM FOR PROVIDING SCREEN SHARING SERVICE THROUGH EXTERNAL ELECTRONIC DEVICE

(71) Applicant: Samsung Electronics Co., Ltd., Suwon-si (KR)

(72) Inventors: Jinbong Ryu, Suwon-si (KR); Minki Kim, Suwon-si (KR); Hyemin Kim, Suwon-si (KR); Hwanyeol Kim, Suwon-si (KR); Hyungjun Ahn, Suwon-si (KR); Sanghun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/929,550

(22) Filed: May 8, 2020

(65) Prior Publication Data
US 2020/0380901 A1 Dec. 3, 2020

(30) Foreign Application Priority Data
May 28, 2019 (KR) .......................... 10-2019-0062743

(51) Int. Cl.
*G09G 3/20* (2006.01)

(52) U.S. Cl.
CPC ........... *G09G 3/20* (2013.01); *G09G 2354/00* (2013.01); *G09G 2360/04* (2013.01);
(Continued)

(58) Field of Classification Search
CPC .. G09G 3/20; G09G 2370/06; G09G 2370/04; G09G 2370/16; G09G 2370/042;
(Continued)

(56) References Cited

U.S. PATENT DOCUMENTS 10,650,790 B2 * 5/2020 Maalouf ................. G09G 5/38
2011/0193982 A1 8/2011 Kook et al.
(Continued)

FOREIGN PATENT DOCUMENTS

JP H06-187120 A 7/1994
JP H06187120 A * 7/1994
(Continued)

OTHER PUBLICATIONS

International Search Report and Written Opinion of the International Searching Authority in connection with International Application No. PCT/KR2020/005963 dated Aug. 25, 2020, 11 pages.

*Primary Examiner* — Brent D Castiaux

(57) ABSTRACT

An electronic device including at least one memory; a first display; a communication circuit; and at least one processor. The at least one processor is configured to while displaying multimedia content on the first display, receive capability data of an external electronic device for indicating that change of a posture of a second display of the external electronic device is available. The at least one processor is also configured to determine a posture of the second display corresponding to a display direction of the multimedia content. The at least one processor is further configured to transmit posture control information for indicating the determined posture to the external electronic device. Additionally, the at least one processor is configured to transmit streaming data of the multimedia content displayed on the first display to the external electronic device in order to display the multimedia content on the second display.

21 Claims, 17 Drawing Sheets

(52) U.S. Cl.
CPC ..... *G09G 2370/04* (2013.01); *G09G 2370/06* (2013.01); *G09G 2370/16* (2013.01)

(58) Field of Classification Search
CPC ........... G09G 2354/00; G09G 2360/04; G09G 2340/0407; G09G 2340/0464; G09G 2340/0492; G09G 2340/14; G09G 2356/00; G06F 3/1454; G06F 3/1462; G06F 3/1423; G06F 3/0346; G06F 3/04817; G06Q 50/10; H04N 7/0125; H04N 21/43637; H04N 21/6437
See application file for complete search history.

(56) References Cited

U.S. PATENT DOCUMENTS

| | | | | |
|---|---|---|---|---|
| 2012/0040719 | A1* | 2/2012 | Lee | G09G 3/2092 455/557 |
| 2012/0154386 | A1* | 6/2012 | Nagara | G06F 3/147 345/419 |
| 2013/0054826 | A1* | 2/2013 | Hong | H04W 4/14 709/231 |
| 2014/0358981 | A1* | 12/2014 | Miyake | H04L 67/1095 709/201 |
| 2015/0193187 | A1 | 7/2015 | Kimn et al. | |
| 2018/0246634 | A1 | 8/2018 | Suh et al. | |

FOREIGN PATENT DOCUMENTS

| | | |
|---|---|---|
| KR | 10-2011-0072163 A | 6/2011 |
| KR | 10-2011-0091378 A | 8/2011 |
| KR | 10-1214894 B1 | 12/2012 |
| KR | 10-1616439 B1 | 4/2016 |
| KR | 10-2017-0000714 A | 1/2017 |
| KR | 10-1890626 B1 | 9/2018 |

* cited by examiner

ELECTRONIC DEVICE, METHOD, AND COMPUTER READABLE MEDIUM FOR PROVIDING SCREEN SHARING SERVICE THROUGH EXTERNAL ELECTRONIC DEVICE

CROSS-REFERENCE TO RELATED APPLICATION

This application is based on and claims priority under 35 U.S.C. § 119 to Korean Patent Application No. 10-2019-0062743, filed on May 28, 2019, in the Korean Intellectual Property Office, the disclosure of which is herein incorporated by reference in its entirety.

BACKGROUND

1. Field

Various embodiments of the disclosure relate to an electronic device, a method, and a computer-readable medium for providing a screen sharing service through an external electronic device.

2. Description of Related Art

With the development of digital technology, electronic devices having mobility and capable of performing communication and/or information processing, such as mobile communication terminals, personal digital assistants (PDAs), electronic schedulers, smartphones, tablet personal computers (PCs), or wearable devices, are widely used. Such electronic devices may provide various services such as shooting, navigation, or web interface provision, in addition to services such as voice communication, text message exchange, or the like.

Thanks to the development of communication technology, various technologies for sharing media contents are developing as accessibility to media contents such as photos, videos, or the like increases. For example, electronic devices provided with screen sharing technology for displaying a screen related to a current electronic device on another electronic device are developing.

The above information is presented as background information only to assist with an understanding of the disclosure. No determination has been made, and no assertion is made, as to whether any of the above might be applicable as prior art with regard to the disclosure.

SUMMARY

An electronic device may provide data for a screen sharing service to an external electronic device. The external electronic device may display a screen on a display of the external electronic device based on the provided data. If a display direction of the screen does not correspond to a posture of the display of the external electronic device, availability of the screen displayed on the display of the external electronic device may be degraded.

The technical object to be achieved by the disclosure is not limited to that mentioned above, and other technical objects that are not mentioned above may be clearly understood to those skilled in the art based on the description provided below.

An electronic device according to one or more embodiments may include: at least one memory configured to store instructions; a first display; a communication circuit; and at least one processor, wherein, when executing the instructions, the at least one processor is configured to: while displaying a multimedia content on the first display, receive capability data of an external electronic device for indicating that change of a posture of a second display of the external electronic device is available, by using the communication circuit; based on the reception of the capability data, determine a posture of the second display corresponding to a display direction of the multimedia content; transmit posture control information for indicating the determined posture to the external electronic device by using the communication circuit; and transmit streaming data of a screen including the multimedia content displayed on the first display to the external electronic device by using the communication circuit in order to display the screen including the multimedia content on the second display having the posture determined based on the posture control information.

An electronic device according to one or more embodiments may include: at least one memory configured to store instructions; a first display; a communication circuit; and at least one processor, wherein, when executing the instructions, the at least one processor is configured to: while displaying a first multimedia content on the first display in a first display direction, transmit first streaming data of a screen including the first multimedia content to an external electronic device by using the communication circuit in order to display the first multimedia content on a second display of the external electronic device; receive an input for changing the first multimedia content displayed on the first display to a second multimedia content; identify a display direction of the second multimedia content based on the reception of the input; when the identified display direction is a second display direction which is distinct from the first display direction, obtain posture control information for changing a posture of the second display based on the second display direction; transmit the posture control information to the external electronic device by using the communication circuit; and transmit second streaming data of a screen including the second multimedia content displayed on the first display to the external electronic device by using the communication circuit in order to display the second multimedia content on the second display having the posture changed based on the posture control information.

According to one or more embodiments, a method executed in an electronic device including a communication circuit and a first display may include: while displaying a multimedia content on the first display, receiving capability data of an external electronic device for indicating that change of a posture of a second display of the external electronic device is available, by using the communication circuit; based on the reception of the capability data, determining a posture of the second display corresponding to a display direction of the multimedia content; transmitting posture control information for indicating the determined posture to the external electronic device by using the communication circuit; and transmitting streaming data of a screen including the multimedia content displayed on the first display to the external electronic device by using the communication circuit in order to display the screen including the multimedia content on the second display having the posture determined based on the posture control information.

According to one or more embodiments, a method executed in an electronic device including a communication circuit and a first display may include: while displaying a first multimedia content on the first display in a first display direction, transmitting first streaming data of a screen including the first multimedia content to an external electronic device by using the communication circuit in order to display the first multimedia content on a second display of the external electronic device; receiving an input for changing the first multimedia content displayed on the first display to a second multimedia content; identifying a display direction of the second multimedia content based on the reception of the input; when the identified display direction is a second display direction which is distinct from the first display direction, obtaining posture control information for changing a posture of the second display based on the second display direction; transmitting the posture control information to the external electronic device by using the communication circuit; and transmitting second streaming data of a screen including the second multimedia content displayed on the first display to the external electronic device by using the communication circuit in order to display the second multimedia content on the second display having the posture changed based on the posture control information.

A non-transitory computer readable storage medium according to one or more embodiments may store one or more programs, wherein the one or more programs include instructions that, when being executed by one or more processors of an electronic device having a communication circuit and a first display, cause the electronic device to: while displaying a multimedia content on the first display, receive capability data of an external electronic device for indicating that change of a posture of a second display of the external electronic device is available, by using the communication circuit; based on the reception of the capability data, determine a posture of the second display corresponding to a display direction of the multimedia content; transmit posture control information for indicating the determined posture to the external electronic device by using the communication circuit; and transmit streaming data of a screen including the multimedia content displayed on the first display to the external electronic device by using the communication circuit in order to display the screen including the multimedia content on the second display having the posture determined based on the posture control information.

A non-transitory computer readable storage medium according to one or more embodiments may store one or more programs, wherein the one or more programs include instructions that, when being executed by one or more processors of an electronic device having a communication circuit and a first display, cause the electronic device to: while displaying a first multimedia content on the first display in a first display direction, transmit first streaming data of a screen including the first multimedia content to an external electronic device by using the communication circuit in order to display the first multimedia content on a second display of the external electronic device; receive an input for changing the first multimedia content displayed on the first display to a second multimedia content; identify a display direction of the second multimedia content based on the reception of the input; when the identified display direction is a second display direction which is distinct from the first display direction, obtain posture control information for changing a posture of the second display based on the second display direction; transmit the posture control information to the external electronic device by using the communication circuit; and transmit second streaming data of a screen including the second multimedia content displayed on the first display to the external electronic device by using the communication circuit in order to display the second multimedia content on the second display having the posture changed based on the posture control information.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
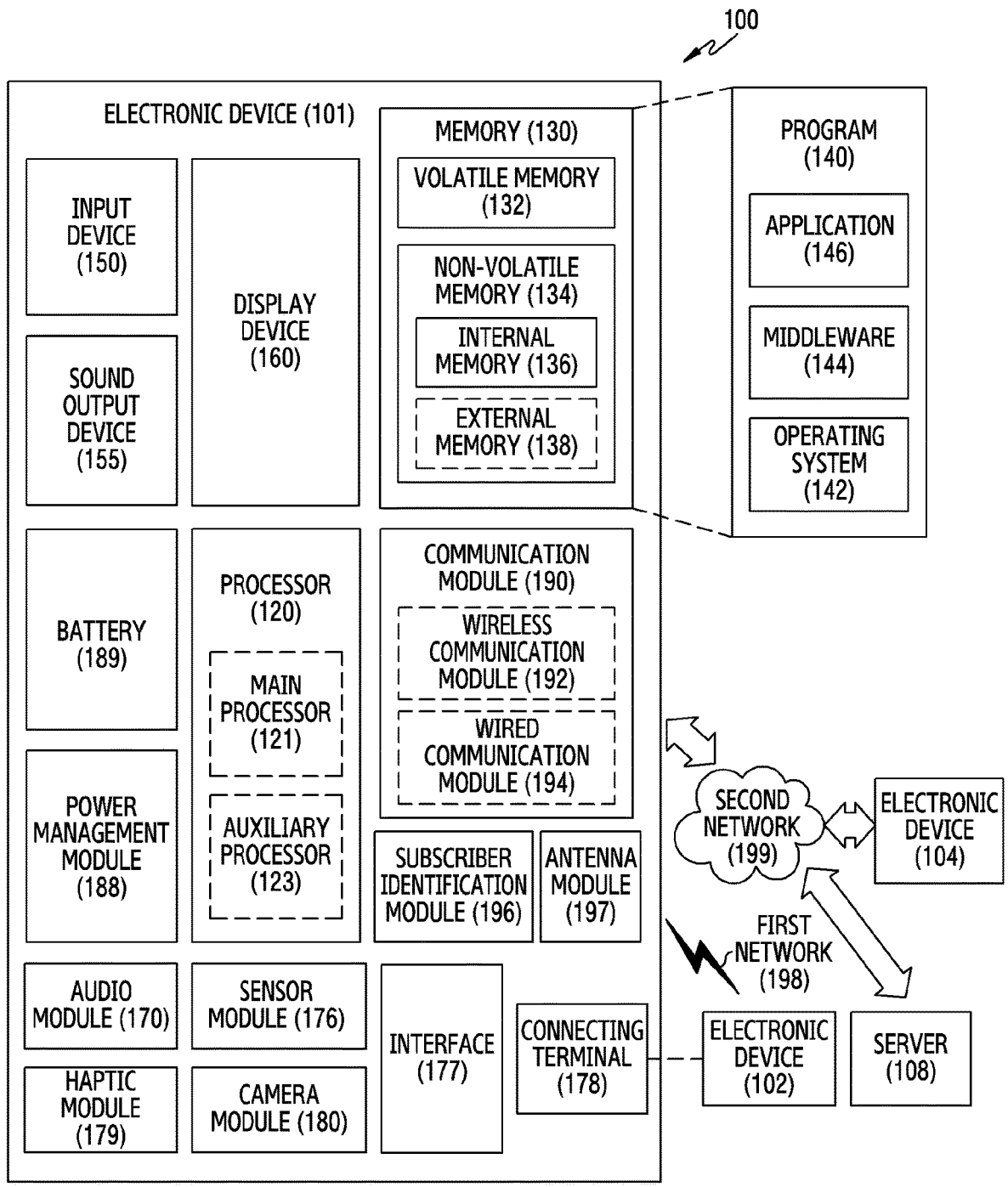
FIG. 1 illustrates a block diagram of an electronic device in a network environment according to various embodiments.

FIG. 1 illustrates a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other components (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as BLUETOOTH, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PLAYSTORE), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
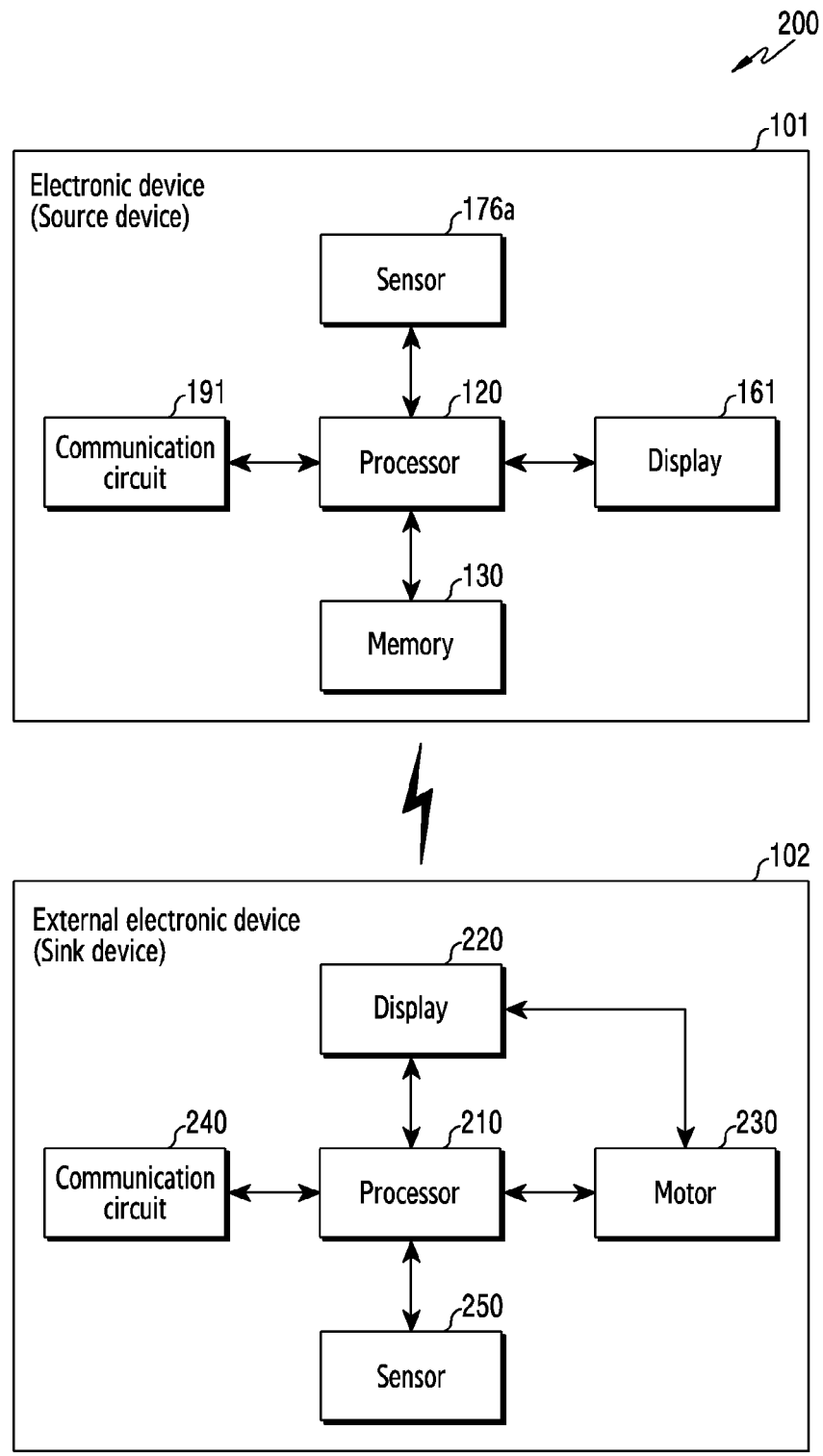
FIG. 2 illustrates a block diagram of an electronic device and an external electronic device according to one or more embodiments.
Figure 3:
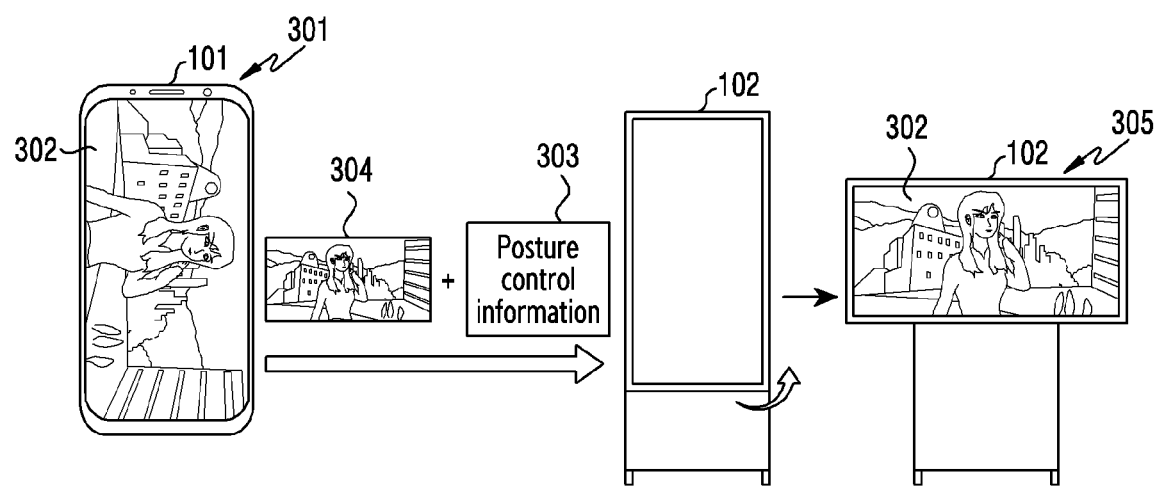
FIG. 3 is a view illustrating an example of changing a posture of a display of an external electronic device based on control of an electronic device according to an embodiment.
Figure 3:
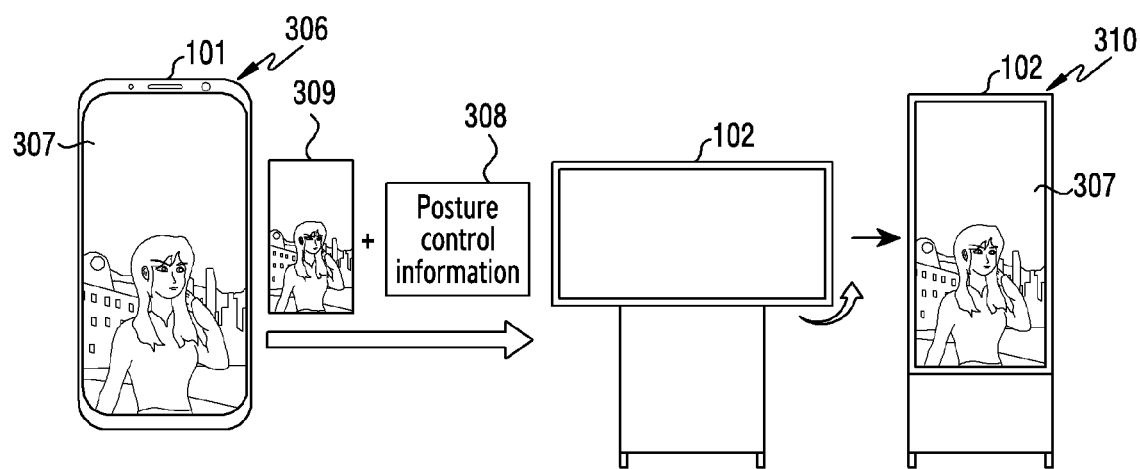
Figure 4:
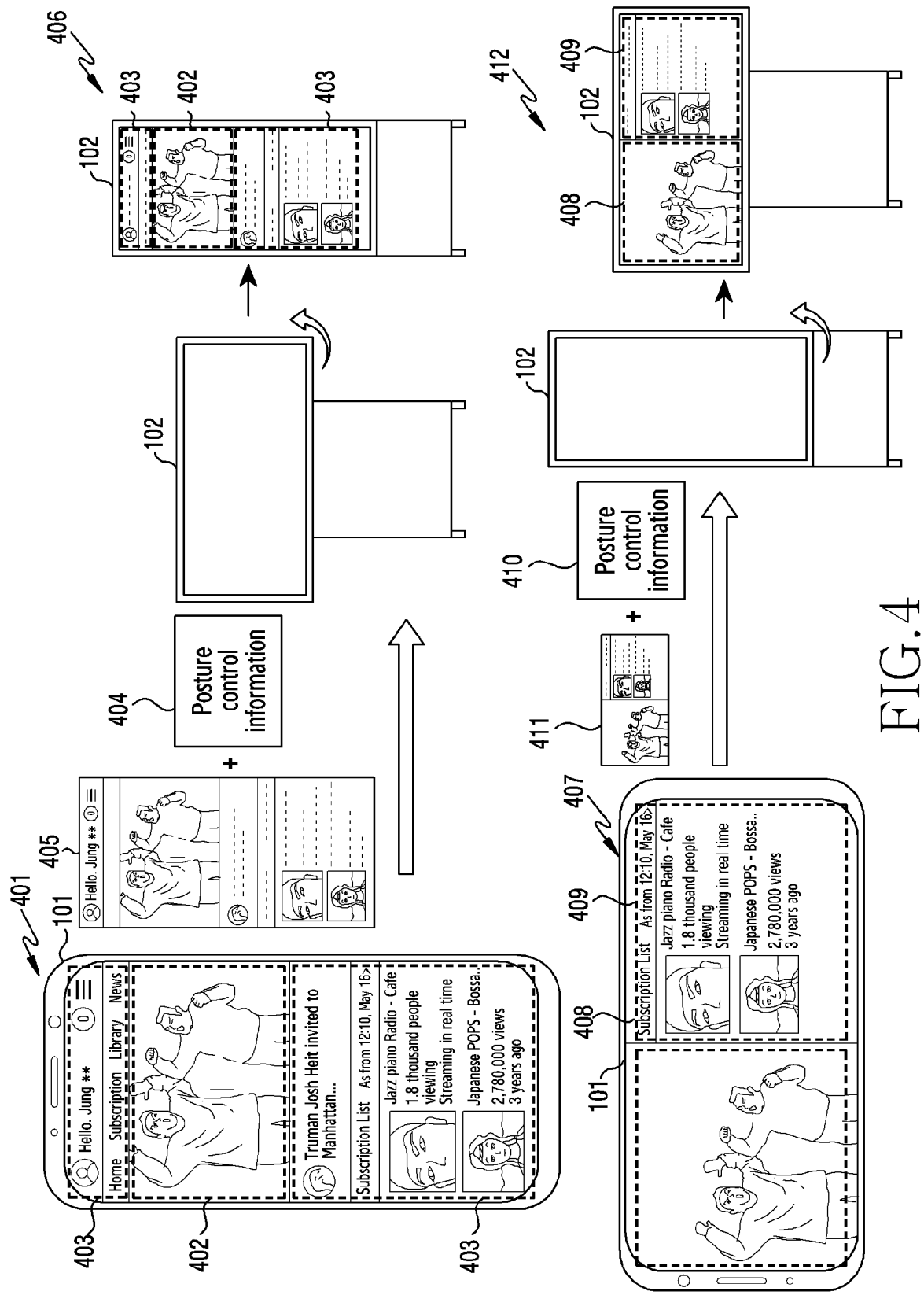
FIG. 4 is a view illustrating another example of changing the posture of the display of the external electronic device according to an embodiment.
Figure 5:
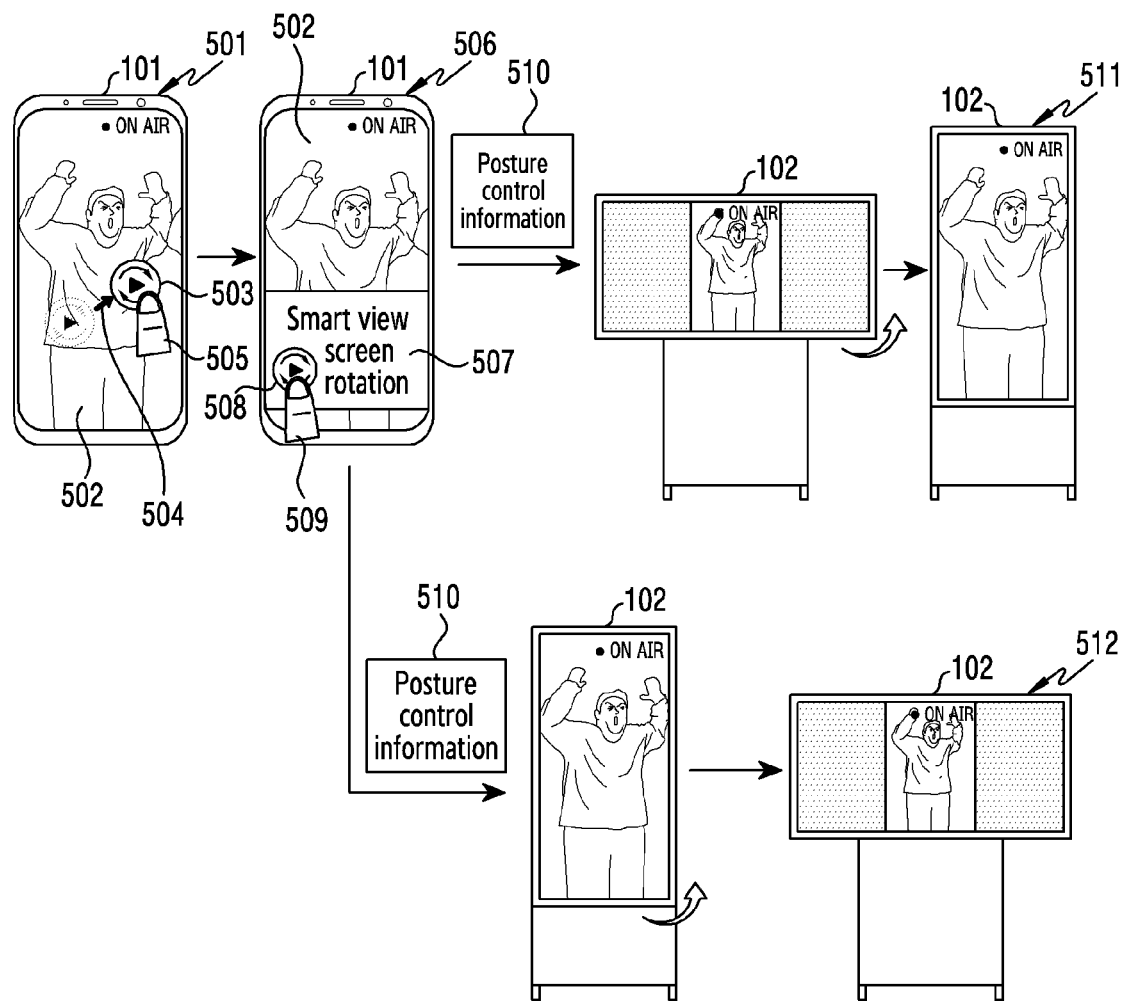
FIG. 5 is a view illustrating still another example of changing the posture of the display of the external electronic device based on control of the electronic device according to an embodiment.
Figure 6:
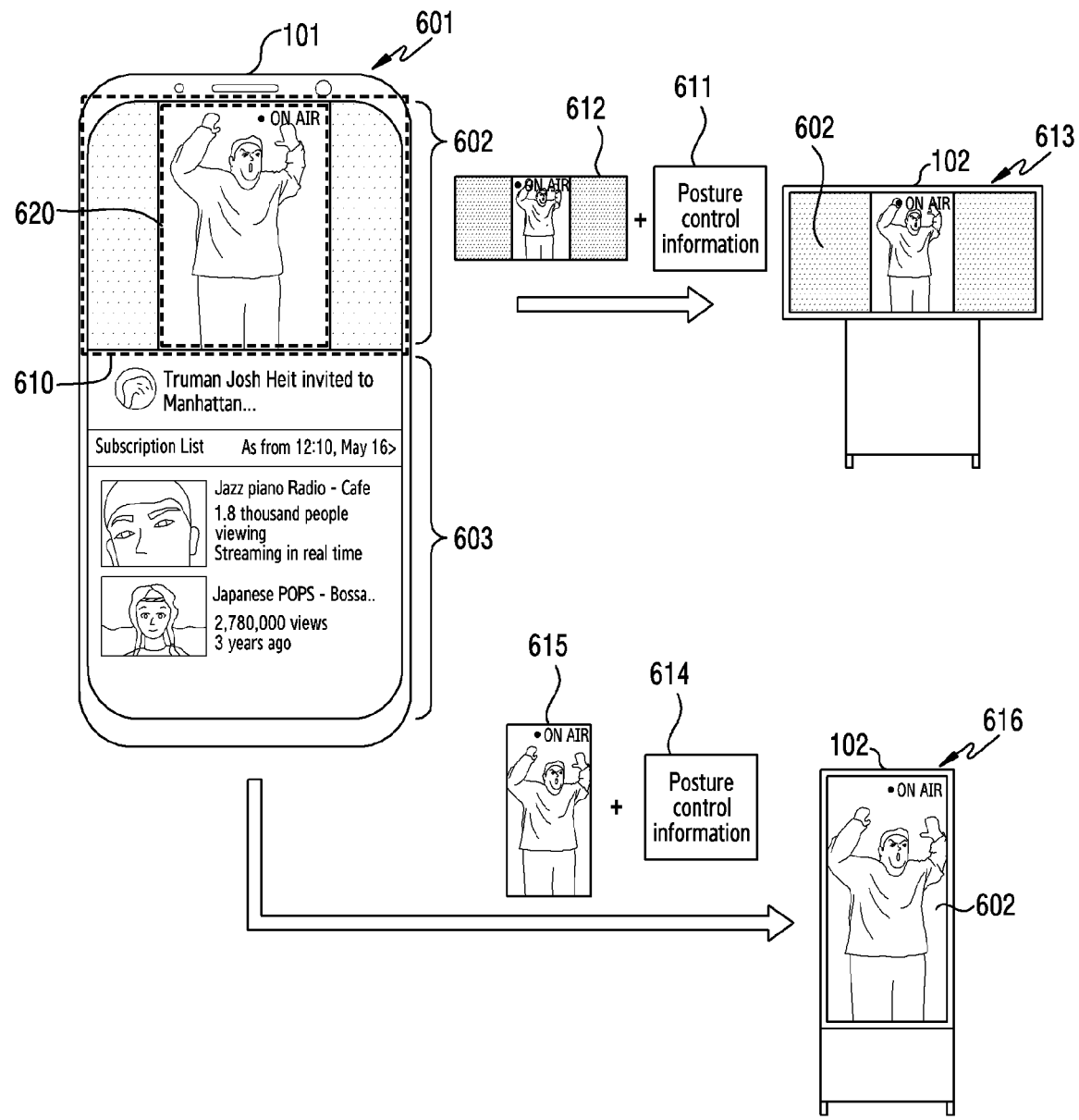
FIG. 6 is a view illustrating yet another example of changing the posture of the display of the external electronic device based on control of the electronic device according to an embodiment.
Figure 7:
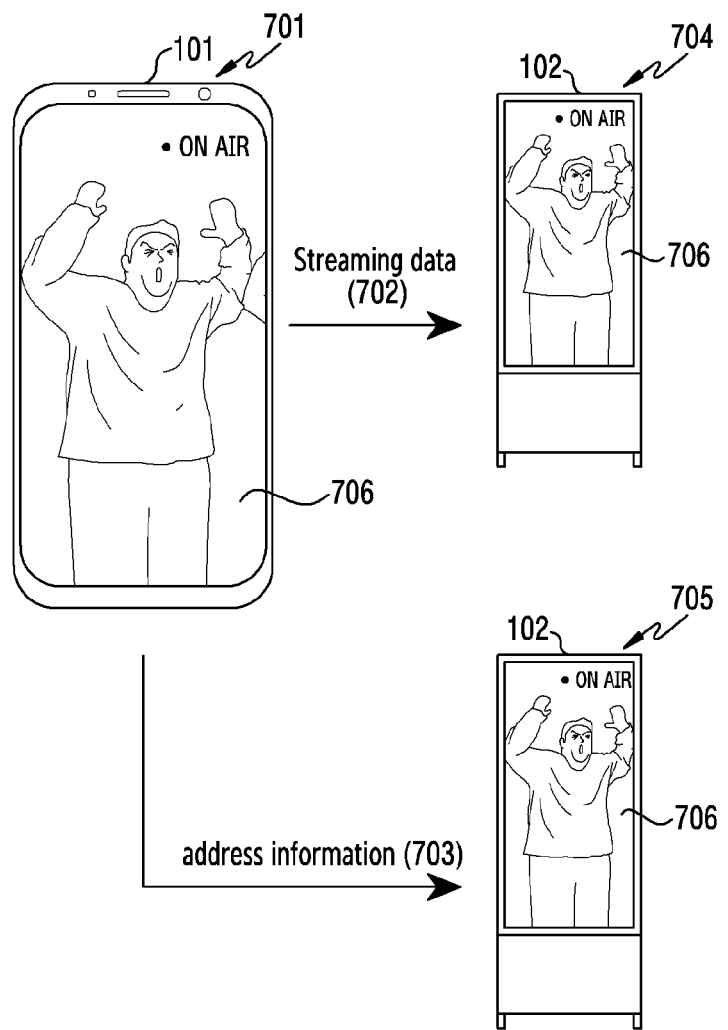
FIG. 7 is a view illustrating an example of transmitting streaming data or address information according to one or more embodiments.

FIG. 2 illustrates a block diagram of an electronic device and an external electronic device according to one or more embodiments. FIG. 3 is a view illustrating an example of changing a posture of a display of an external electronic device based on control of an electronic device according to an embodiment. FIG. 4 is a view illustrating another example of changing the posture of the display of the external electronic device according to an embodiment. FIG. 5 is a view illustrating still another example of changing the posture of the display of the external electronic device based on control of the electronic device according to an embodiment, and FIG. 6 is a view illustrating yet another example of changing the posture of the display of the external electronic device based on control of the electronic device according to an embodiment. FIG. 7 is a view illustrating an example of transmitting streaming data or address information according to one or more embodiments.

Referring to FIG. 2, an environment 200 may include an electronic device 101 and an electronic device 102. In one or more embodiments, the electronic device 101 may be referred to as a source device since the electronic device 101 may provide data to the electronic device 102 in a screen sharing service. In one or more embodiments, the electronic device 102 may be referred to as an external electronic device 102 since it is distinct from the electronic device 101 and is positioned out of the electronic device 101. In one or more embodiments, the external electronic device 102 may be referred to as a sink device since the external electronic device 102 obtains data from the electronic device 101 in the screen sharing service.

In one or more embodiments, the electronic device 101 may include a processor 120, a memory 130, a display 161, a sensor 176a, and/or a communication circuit 191. In one or more embodiments, the processor 120 may include the processor 120 defined by description of FIG. 1, the memory 130 may include the memory 130 defined by description of FIG. 1, the display 161 may include the display device 160 defined by description of FIG. 1, the sensor 176a may include at least one of the gesture sensor, the gyro sensor, the magnetic sensor, the acceleration sensor, the grip sensor, the proximity sensor, or the illuminance sensor in the sensor module 176 defined by description of FIG. 1, and the communication circuit 191 may include the communication module 190 defined by description of FIG. 1.

In one or more embodiments, the processor 120 may be operably connected or coupled with the components (for example, the memory 130, the display 161, the sensor 176a, and the communication circuit 191) of the electronic device 101. In one or mor embodiments, the processor 120 may control the components of the electronic device 101 based on the connection or coupling. For example, the processor 120 may control the components of the electronic device 101 by executing instructions stored in the memory 130.

In one or more embodiments, the sensor 176a may be used to obtain data regarding a posture of the electronic device 101. In one or more embodiments, the sensor 176a may obtain data regarding the posture of the electronic device 101 and may provide the obtained data to the processor 120.

In one or more embodiments, the processor 120 may identify a display direction of a screen displayed on the display 161. The electronic device 101 may provide a portrait mode and a landscape mode in the display direction of the screen. The portrait mode of the electronic device 101 may be a mode in which the screen displayed on the display 161 is displayed in a vertical direction. The landscape mode of the electronic device 101 may be a mode in which the screen displayed on the display 161 is displayed in a horizontal direction.

In one or more embodiments, the electronic device 101 may determine one of the portrait mode and the landscape mode as the display direction based on the posture of the electronic device 101. For example, when the posture of the electronic device 101 obtained from the sensor 176a is the vertical direction, the processor 120 may determine the display direction of the screen as the portrait mode. The processor 120 may identify the display direction of the screen displayed on the display 161 as the portrait mode, based at least on the determination.

In one or more embodiments, the electronic device 101 may determine the display direction based on one of the portrait mode and the landscape mode, based on a user's request. For example, even when the posture of the electronic device 101 obtained from the sensor 176a is the vertical direction in a state where a media content (for example, an image) is displayed on the display 161, the electronic device 101 may change the display direction to the landscape mode through a user request (or a user input) on a function item (for example, an image rotate button) displayed on an application (for example, an image viewer application). The processor 120 may identify the display direction of the screen displayed on the display 161 as the landscape mode, based at least on the change.

In one or more embodiments, the electronic device 101 may determine the display direction of one of the portrait mode and the landscape mode based on a type of an ongoing application. For example, when an application for replaying a multimedia (for example, a video) is executed, the processor 120 may determine the display direction as the landscape mode.

In one or more embodiments, the processor 120 may receive, from the external electronic device 102 through the communication circuit 191, capability data of the external electronic device 102 for indicating that the change of the posture of the display 220 of the external electronic device 102 is available. In an embodiment, the processor 120 may receive the capability data before establishing communication connection with the external electronic device 102. For example, the processor 120 may receive the capability data in a capability exchange and negotiation procedure for establishing communication connection for the screen sharing service, based on reception of an input for indicating the initiation of the screen sharing service with the external electronic device 102. In an embodiment, the processor 120 may establish communication connection with the external electronic device 102, and may receive the capability data from the external electronic device 102 while maintaining the communication connection. For example, the processor 120 may establish the communication connection for the screen sharing service with the external electronic device 102, and may receive the capability data from the external electronic device 102 through the communication connection while maintaining the communication connection.

In an embodiment, the capability data may be transmitted from the external electronic device 102 to the electronic device 101 based on an explicit request of the electronic device 101. For example, the processor 120 may request the external electronic device 102 to transmit the capability data by using the communication circuit 191, and, in response to the request, the external electronic device 102 may transmit the capability data to the electronic device 101. In an embodiment, the capability data may be transmitted from the external electronic device 102 to the electronic device 101 based on an implicit request of the electronic device 101. For example, the processor 120 may request the external electronic device 102 to transmit another data (for example, data for requesting resources required to establish communication connection) which is distinct from the capability data by using the communication circuit 191, and, in response to the request, the external electronic device 102 may transmit the capability data along with another data. In an embodiment, the capability data may be transmitted from the external electronic device 102 to the electronic device 101 without a request of the electronic device 101. For example, the capability data may be transmitted from the external electronic device 102 to the electronic device 101 based on a predetermined or predefined protocol between the electronic device 101 and the external electronic device 102. In another example, the capability data may be included in at least a part of broadcast signals and/or synchronization signals transmitted from the external electronic device 102.

In one or more embodiments, the capability data may further include another information in addition to information for indicating that the change of the posture of the display 220 of the external electronic device 102 is available. For example, the capability data may further include information regarding video codecs supportable by the external electronic device 102. For example, the capability data may further include information regarding audio codecs supportable by the external electronic device 102.

In one or more embodiments, the processor 120 may determine a posture of a display 220 of the external electronic device 102 which displays a media content from the electronic device 101, based on the reception of the capability data.

In one or more embodiments, the media content may be the media content that is displayed on the display 161. In one or more embodiments, the media content may be a media content that will be displayed on the display 161. In one or more embodiments, the media content may be a media content that is not displayed on the display 161 but is processed by the processor 120 in a background state. In one or more embodiments, the media content may be displayed along with at least one other visual object. For example, the at least one other visual object may be displayed along with at least one of an executable object for performing a designated function, a thumbnail image for representing another media content, or a text for providing information regarding the media content and/or another media content.

In one or more embodiments, a display area of the display 220 of the external electronic device 102 may have an aspect ratio (for example, 16:9, 21:9, etc.) distinct from 1:1, and the posture of the display 220 of the external electronic device 102 having the aspect ratio distinct from 1:1 may be variously changed. For example, the posture of the display 220 of the external electronic device 102 may include a first designated posture for providing the portrait mode, and a second designated posture for providing the landscape mode which is rotated from the first designated posture by a designated angle (for example, 90 degrees), and the posture of the display 220 of the external electronic device 102 may be changed from the first designated posture to the second designated posture or from the second designated posture to the first designated posture.

In an embodiment, the processor 120 may identify a display direction of the screen displayed on the display 161 of the electronic device 101 and/or a display direction of the media content, based on the reception of the capability, and may determine a posture of the display 220 of the external electronic device 102 corresponding to the identified display direction.

In one or more embodiments, the processor 120 may display various screens on the display 161. For example, the processor 120 may display an execution screen of at least one application (for example, a browser, a message application, a game) and/or a screen including various objects (for example, a notification bar, an execution icon) on the display 161. In another example, the processor 120 may display a media content (for example, an image, a video) on the display 161 through a replay application. The screen may be displayed on the display 161 in the portrait mode or the landscape mode. Hereinafter, for convenience of explanation, it is assumed that the screen displayed on the display 161 is a replay screen of a multimedia content. However, those skilled in the art can easily understand that the screen according to various embodiments of the disclosure is not limited thereto. For example, a screen shared between the electronic device 101 and the external electronic device 102 may include various screens displayable on the display 161, such as a home screen, a lock screen, a screen of an internet browser, a screen of a document edit application, a screen of a game application, and a split screen including a plurality of small screens.

In one or more embodiments, the processor 120 may identify a display direction of the multimedia content. For example, the processor 120 may identify the display direction of the multimedia content by identifying a display direction (for example, the portrait mode or the landscape mode) of the screen displayed on the display 161. For example, the processor 120 may identify the display direction of the multimedia content, based on information regarding a size of the multimedia content included in metadata regarding the multimedia content. In another example, the processor 120 may identify the display direction of the multimedia content based on information regarding an aspect ratio of the multimedia content included in the metadata. For example, when the aspect ratio of the multimedia content is 16:9, the processor 120 may identify the display direction of the multimedia content as the horizontal direction, and, when the aspect ratio of the multimedia content is 9:16, the processor 120 may identify the display direction of the multimedia content as the vertical direction. According to embodiments, the metadata may be included in a file including the multimedia content, and may be included in another file which is distinct from the file including the multimedia content and is associated with the file. In another example, the processor 120 may identify a main object from the multimedia content, and may identify the display direction of the multimedia content based on a display direction of the identified main object. In still another example, the processor 120 may identify a text from the multimedia content and may identify the display direction of the multimedia content, based on a display direction of the identified text. In yet another example, the processor 120 may identify the display direction of the multimedia content, based on two or more of the information regarding the size of the multimedia content in the metadata, the information regarding the aspect ratio of the multimedia content in the metadata, the display direction of the main object in the multimedia content, or the display direction of the text in the multimedia content.

In one or more embodiments, the processor 120 may determine a posture of the display 220 of the external electronic device 102 to correspond to the display direction of the multimedia content while displaying the multimedia content on the display 220. For example, when the display direction of the multimedia content is the horizontal direction, the processor 120 may determine the posture of the display 220 of the external electronic device 102 to be the horizontal direction (or a posture for providing the landscape mode). In another example, when the display direction of the multimedia content is the vertical direction, the processor 120 may determine the posture of the display 220 of the external electronic device 102 to be the vertical direction (or a posture for providing the portrait mode). The processor 120 may transmit posture control information for indicating the determined posture by using the communication circuit 191. According to embodiments, when data for indicating a current posture of the display 220 of the external electronic device 102 is already received from the external electronic device 102, the processor 120 may not obtain the posture control information. For example, when the data for indicating the current posture of the display 220 of the external electronic device 102 is already received from the external electronic device 102, the processor 120 may bypass, defer, forgo, or skip obtaining the posture control information. According to various embodiments, when the data for indicating the current posture of the display 220 of the external electronic device 102 is already received from the external electronic device 102, the processor 120 may not transmit the posture control information. For example, when the data for indicating the current posture of the display 220 of the external electronic device 102 is already received from the external electronic device 102, the processor 120 may bypass, defer, forgo, or skip transmitting the posture control information. For example, when the determined posture corresponds to the current posture of the display 220 of the external electronic device 102 identified based on the already received data, the processor 120 may bypass, defer, forgo, or skip transmitting the posture control information. However, this should not be considered as limiting.

In one or more embodiments, a processor 210 of the external electronic device 102 may receive the posture control information by using a communication circuit 240. The processor 210 may determine whether to change the posture of the display 220 of the external electronic device 102 or whether to maintain the posture of the display 220 of the external electronic device 102, based on the posture control information. For example, when the posture of the display 220 of the external electronic device 102 identified based on the posture control information corresponds to the current posture of the display 220 of the external electronic device 102, the processor 210 may determine to maintain the posture of the display 220 of the external electronic device 102. In another example, when the posture of the display 220 of the external electronic device 102 identified based on the posture control information is distinct (or different) from the current posture of the display 220 of the external electronic device 102, the processor 210 may determine to change the posture of the display 220 of the external electronic device 102. Based on it being determined that the posture of the display 220 of the external electronic device 102 is changed, the processor 210 may control a motor 230 to change the posture of the display 220 of the external electronic device 102 to the posture of the display 220 of the external electronic device 102 identified based on the posture control information. According to various embodiments, the processor 210 may identify whether an externa object is positioned on the periphery of the external electronic device 102 (or on the periphery of the display 220 of the external electronic device 102) by using the sensor 250 before changing the posture of the display 220 of the external electronic device 102, and, when the external object is positioned on the periphery of the external electronic device 102, the processor 210 may bypass, defer, forgo, or skip changing the posture of the display 220 of the external electronic device 102. This may be to prevent a damage of the display 220 caused by the external object positioned on the periphery of the external electronic device 102, or a damage of the external object caused by change of the posture of the display 220 of the external electronic device 102. When the posture of the display 220 is set to a posture different from the postured indicated by the posture control information due to the external object, the processor 210 may perform various processing operations. For example, when the posture of the display 220 of the external electronic device 102 is set to the posture different from the posture indicated by the posture control information, the processor 210 may display, on the display 220, information for guiding to place the external object apart from the external electronic device 102 by a designated distance or longer. In another example, when the posture of the display 220 of the external electronic device 102 is set to the posture different from the posture indicated by the posture control information, the processor 210 may display, on the display 220, information for guiding that the position of the external object is required to be moved to change the posture of the display 220. In yet another example, when the posture of the display 220 of the external electronic device 102 is set to the posture different from the posture indicated by the posture control information, the processor 210 may display, on the display 220, information for guiding that change of the posture of the display 220 is canceled due to the external object. The information may further include an executable object for retrying the change of the posture of the display 220. The processor 210 may retry to change the posture of the display 220 in response to an input on the executable object. In further example, when the external electronic device 102 is implemented as a movable robot, the processor 210 may move the external electronic device 102 to be spaced apart from the external object by a designated distance or longer (or to avoid the external object) in order to prevent collision between the display 220 and the external object, and may change the posture of the display 220 after finishing the movement. In still further example, when the posture of the display 220 of the external electronic device 102 is set to the posture different from the posture indicated by the posture control information, the processor 210 may transmit, to the electronic device 101 by using the communication circuit 240, a message for indicating that the multimedia content will be displayed in a display direction corresponding to the different posture. However, this should not be considered as limiting.

In an embodiment, after transmitting the posture control information, the processor 120 may transmit streaming data of the screen including the multimedia content displayed on the display 161 to the external electronic device 102 by using the communication circuit 191 in order to display the multimedia content on the display 220 of the external electronic device 102 having the posture determined based on the posture control information. In an embodiment, the streaming data of the screen including the multimedia content may be obtained by capturing the screen including the multimedia content displayed on the display 161. In an embodiment, the streaming data of the multimedia content may be used to display the screen including the multimedia content on the display 220 of the external electronic device 102 in the identified display direction. In an embodiment, the streaming data may be referred to as mirroring data.

For example, referring to FIG. 3, in a state 301, the processor 120 according to an embodiment may identify that a display direction of a multimedia content 302 is the horizontal direction different from a posture of the electronic device 101, based on reception of the capability data of the external electronic device 102, and may determine a posture of the display 220 of the external electronic device 102 corresponding to the horizontal direction and may transmit posture control information 303 for indicating the determined posture to the external electronic device 102 by using the communication circuit 191. In the state 301, after transmitting the posture control information 303 or with the posture control information 303, the processor 120 may transmit streaming data 304 of the screen including the multimedia content 302 to the external electronic device 102 by using the communication circuit 191. For example, the streaming data 304 may be configured in the horizontal direction different from the posture of the electronic device

101. In a state 305, the processor 210 may receive the posture control information 303 by using the communication circuit 240, and, based on the received posture control information 303, the processor 210 may control the motor 230 operably coupled with the display 220 to change a posture of the display 220 from a first designated posture for providing the portrait mode to a second designated posture for providing the landscape mode. After changing the first designated posture to the second designated posture, while changing the first designated posture to the second designated posture, or before changing the first designated posture to the second designated posture, the processor 210 may display the multimedia content 302 on the display 220 based on the streaming data 304.

In an embodiment, in a state 306, the processor 120 may identify that a display direction of a multimedia content 307 is the vertical direction corresponding to the posture of the electronic device 101, based on reception of the capability data of the external electronic device 102, and may determine a posture of the display 220 of the external electronic device 102 corresponding to the vertical direction and may transmit posture control information 308 for indicating the determined posture to the external electronic device 102 by using the communication circuit 191. In the state 306, after transmitting the posture control information 308 or with the posture control information 308, the processor 120 may transmit streaming data 309 of the screen including the multimedia content 307 to the external electronic device 102 by using the communication circuit 191. For example, the streaming data 309 may be configured in the vertical direction corresponding to the posture of the electronic device 101. In a state 310, the processor 210 may receive the posture control information 308 by using the communication circuit 240, and, based on the received posture control information 308, the processor 210 may control the motor 230 operably coupled with the display 220 to change the posture of the display 220 from the second designated posture to the first designated posture. After changing the second designated posture to the first designated posture, while changing the second designated posture to the first designated posture, or before changing the second designated posture to the first designated posture, the processor 210 may display the multimedia content 307 on the display 220 based on the streaming data 309.

In an embodiment, based on the reception of the capability data, the processor 120 may identify a posture of the electronic device 101, and may determine a posture of the display 220 of the external electronic device 102 corresponding to the identified posture of the electronic device 101.

For example, the processor 120 may identify whether the posture of the electronic device 101 while displaying the multimedia content on the display 161 is the posture for providing the portrait mode or the posture for providing the landscape mode by using the sensor 176*a*. In another example, the processor 120 may identify whether the posture of the electronic device 101 is the posture for providing the portrait mode or the posture for providing the landscape mode, based on a direction of a designated component of the electronic device 101 (for example, a camera-facing direction of the electronic device 101 or a direction of an opening or hole in the display 161 in which the camera is disposed). In still another example, the processor 120 may identify whether the posture of the electronic device 101 is the posture for providing the portrait mode or the posture for providing the landscape mode, based on a position of a designated component of the electronic device 101 (for example, a position of a physical key seen through a portion of a housing of the electronic device 101, a position of an illuminance sensor seen through a portion of the housing of the electronic device 101, or a position of a microphone or a speaker seen through a portion of the housing of the electronic device 101). In yet another example, the processor 120 may identify whether the posture of the electronic device 101 is the posture for providing the portrait mode or the posture for providing the landscape mode, based on a relative position relationship between a specific point of the electronic device 101 and the direction of gravity. However, this should not be considered as limiting.

In an embodiment, the processor 120 may determine a posture of the display 220 of the external electronic device 102 while displaying the multimedia content on the display 220 to correspond to the identified posture of the electronic device 101. For example, when the posture of the electronic device 101 is the posture for providing the portrait mode, the processor 120 may determine the posture of the display 220 of the external electronic device 102 to be the vertical direction (or the posture for providing the portrait mode). In another example, when the identified posture of the electronic device 101 is the posture for providing the landscape mode, the processor 120 may determine the posture of the display 220 of the external electronic device 102 to be the horizontal direction (or the posture for providing the landscape mode).

In an embodiment, the processor 120 may transmit posture control information for indicating the determined posture by using the communication circuit 191. According to various embodiments, when the display 220 of the external electronic device 102 is a deformable display (for example, a foldable display or a rollable display) that can have its aspect ratio adaptively changed, the processor 120 may transmit the posture control information for changing the aspect ratio of the display 220 to the external electronic device 102 by using the communication circuit 191.

According to one or more embodiments, when data for indicating a current posture of the display 220 of the external electronic device 102 is already received from the external electronic device 102, the processor 120 may skip, bypass, defer, or forgo transmitting the posture control information. For example, when the determined posture corresponds to the current posture of the display 220 of the external electronic device 102 identified based on the already received data, the processor 120 may skip, bypass, defer, or forgo transmitting the posture control information. However, this should not be considered as limiting.

The processor 210 of the external electronic device 102 according to an embodiment may receive the posture control information by using the communication circuit 240. The processor 210 may determine whether to change the posture of the display 220 of the external electronic device 102 or whether to maintain the posture of the display 220 of the external electronic device 102, based on the posture control information. For example, when the posture of the display 220 of the external electronic device 102 identified based on the posture control information corresponds to the current posture of the display 220 of the external electronic device 102, the processor 210 may determine to maintain the posture of the display 220 of the external electronic device 102. In another example, when the posture of the display 220 of the external electronic device 102 identified based on the posture control information is distinct (or different) from the current posture of the display 220 of the external electronic device 102, the processor 210 may determine to change the posture of the display 220 of the external electronic device 102. Based on the posture of the display 220 of the external electronic device 102 being determined to be changed, the processor 210 may control the motor 230 to change the posture of the display 220 of the external electronic device 102 to the posture of the display 220 of the external electronic device 102 identified based on the posture control information. According to embodiments, the processor 210 may identify whether an external object is positioned on the periphery of the external electronic device 102 (or on the periphery of the display 220 of the external electronic device 102) by using the sensor 250 before changing the posture of the display 220 of the external electronic device 102, and, when the external object is positioned on the periphery of the external electronic device 102, the processor 210 may skip, bypass, defer, or forgo changing the posture of the display 220 of the external electronic device 102. This may be to prevent a damage of the display 220 caused by the external object positioned on the periphery of the external electronic device 102, or a damage of the external object caused by change of the posture of the display 220 of the external electronic device 102. When the posture of the display 220 is set to a posture different from the posture indicated by the posture control information due to the external object, the processor 210 may perform various processing operations. For example, when the posture of the display 220 of the external electronic device 102 is set to the posture different from the posture indicated by the posture control information, the processor 210 may display, on the display 220, information for guiding to place the external object apart from the external electronic device 102 by a designated distance or longer. In another example, when the posture of the display 220 of the external electronic device 102 is set to the posture different from the posture indicated by the posture control information, the processor 210 may transmit, to the electronic device 101 by using the communication circuit 240, a message for indicating that the multimedia content will be displayed in a display direction corresponding to the different posture. However, this should not be considered as limiting.

In an embodiment, after transmitting the posture control information, the processor 120 may transmit, to the external electronic device 102 by using the communication circuit 191, streaming data of the screen including the multimedia content displayed on the display 161 in order to display the multimedia content on the display 220 of the external electronic device 102 having the posture determined based on the posture control information. In an embodiment, the streaming data of the multimedia content may be obtained by capturing the screen including the multimedia content displayed on the display 161. In an embodiment, the streaming data of the screen including the multimedia content may be used to display the multimedia content on the display 220 of the external electronic device 102 in a direction corresponding to the posture of the electronic device 101.

Referring to FIG. 4, in a state 401, the processor 120 according to an embodiment may identify that a posture of the electronic device 101 while displaying a multimedia content 402 and visual objects 403 on the display 161 is the posture for providing the portrait mode, based on reception of the capability data of the external electronic device 102, and may determine a posture of the display 220 of the external electronic device 102 to be the first designated posture corresponding to the identified posture of the electronic device 101, and may transmit posture control information 404 for indicating the determined posture to the external electronic device 102 by using the communication circuit 191. In the state 401, after transmitting the posture control information 404 or with the posture control information 404, the processor 120 may transmit streaming data 405 corresponding to captured data of the screen including the multimedia content 402 and the visual objects 403 to the external electronic device 102 by using the communication circuit 191. For example, the streaming data 405 may be configured in the vertical direction corresponding to the posture of the electronic device 101. In a state 406, the processor 210 may receive the posture control information 404 by using the communication circuit 240, and may control the motor 230 operably coupled with the display 220 based on the received posture control information 404 to change the posture of the display 220 from the second designated posture for providing the landscape mode to the first designated posture for providing the portrait mode. After changing the second designated posture to the first designated posture, while changing the second designated posture to the first designated posture, or before changing the second designated posture to the first designated posture, the processor 210 may display the multimedia content 402 and the visual objects 403 on the display 220 based on the streaming data 405.

In an embodiment, in a state 407, the processor 120 may identify that a posture of the electronic device 101 while displaying a multimedia content 408 and visual objects 490 on the display 161 is the posture for providing the landscape mode, based on reception of the capability data of the external electronic device 102, and may determine the posture of the display 220 of the external electronic device 102 to be the second designated posture corresponding to the identified posture of the electronic device 101 and may transmit posture control information 410 for indicating the determined posture to the external electronic device 102 by using the communication circuit 191. In the state 407, after transmitting the posture control information 410 or with the posture control information 410, the processor 120 may transmit streaming data 411 corresponding to captured data of the screen including the multimedia content 408 and the visual objects 409 to the external electronic device 102 by using the communication circuit 191. For example, the streaming data 411 may be configured in the horizontal direction corresponding to the posture of the electronic device 101. In a state 412, the processor 210 may receive the posture control information 410 by using the communication circuit 240, and may control the motor 230 operably coupled with the display 220 based on the received posture control information 410 to change the posture of the display 220 from the first designated posture for providing the portrait mode to the second designated posture for providing the landscape mode. After changing the first designated posture to the second designated posture, while changing the first designated posture to the second designated posture, or before changing the first designated posture to the second designated posture, the processor 210 may display the multimedia content 408 and the visual objects 409 on the display 220 based on the streaming data 411.

In an embodiment, when a posture control mode in which the electronic device 101 controls a posture of the display 220 of the external electronic device 102 is enabled, the processor 120 may perform at least some of the operations exemplified through descriptions of FIGS. 3 and 4, based on the reception of the capability data. For example, the posture control mode may refer to a mode in which the posture of the display 220 of the external electronic device 102 is controlled based on a posture of the electronic device 101 and/or a direction of the multimedia content, without an explicit input for changing the posture of the display 220 of the external electronic device 102. In an embodiment, when the posture control mode is disabled, the processor 120 may display an icon floating on the multimedia content displayed on the display 161, based on the reception of the capability data. In an embodiment, the icon may be used to invoke a setting window for controlling the posture of the display 220 of the external electronic device 102. In an embodiment, the icon may be moved based on a drag input on the icon. The processor 120 may display an executable object for determining the posture of the display 220 of the external electronic device 101 within a window (for example, the setting window) partially superimposed on the multimedia content, based on reception of a touch input on the icon. In response to the input on the executable object being received, the processor 120 may determine the posture of the display 220 of the external electronic device 102 corresponding to the input on the executable object. For example, when the posture of the display 220 of the external electronic device 102 is the first designated posture, the processor 120 may determine the posture of the display 220 of the external electronic device 102 to be the second designated posture changed from the first designated posture, based on the input on the executable object. In another example, when the posture of the display 220 of the external electronic device 102 is the second designated posture, the processor 120 may determine the posture of the display 220 of the external electronic device 102 to be the first designated posture changed from the second designated posture, based on the input on the executable object. However, this should not be considered as limiting. The processor 120 may transmit posture control information for indicating the determined posture by using the communication circuit 191.

In an embodiment, the processor 210 of the external electronic device 102 may receive the posture control information by using the communication circuit 240. The processor 210 may change the posture of the display 220 of the external electronic device 102, based on the posture control information. For example, based on the posture control information, the processor 210 may control the motor 230 operably coupled with the display 220 to change the posture of the display 220 of the external electronic device 102 from the first designated posture to the second designated posture or from the second designated posture to the first designated posture. According to embodiments, before changing the posture of the display 220 of the external electronic device 102, the processor 210 may identify whether an external object is positioned on the periphery of the external electronic device 102 (or on the periphery of the display 220 of the external electronic device 102) by using the sensor 250, and, when the external object is positioned on the periphery of the external electronic device 102, the processor 210 may skip, bypass, defer, or forgo changing the posture of the display 220 of the external electronic device 102. This may be to prevent a damage of the display 220 caused by the external object positioned on the periphery of the external electronic device 102, or a damage of the external object caused by change of the posture of the display 220 of the external electronic device 102. When the posture of the display 220 is set to a posture different from the posture indicated by the posture control information due to the external object, the processor 210 may perform various processing operations. For example, when the posture of the display 220 of the external electronic device is set to the posture different from the posture indicated by the posture control information, the processor 210 may display, on the display 220, information for guiding to place the external object apart from the external electronic device 102 by a designated distance or longer. In another example, when the posture of the display 220 of the external electronic device 102 is set to the posture different from the posture indicated by the posture control information, the processor 210 may transmit, to the electronic device 101 by using the communication circuit 240, a message for indicating that the multimedia data will be displayed in a display direction corresponding to the different posture. However, this should not be considered as limiting.

In an embodiment, after transmitting the posture control information, the processor 120 may transmit, to the external electronic device 102 by using the communication circuit 191, streaming data of the screen including the multimedia content displayed on the display 161 in order to display the multimedia content on the display 220 of the external electronic device 102 having the posture changed based on the posture control information. In an embodiment, the streaming data of the multimedia content may be obtained by capturing the screen including the multimedia content displayed on the display 161. In an embodiment, the streaming data of the multimedia content may be used to display the multimedia data on the display 220 of the external electronic device 102 to be suitable to the changed posture of the display 220 of the external electronic device 102.

For example, referring to FIG. 5, when the posture control mode is disabled in a state 501, the processor 120 may display an icon 503 floating on a multimedia content 502 displayed on the display 161. For example, the icon 503 may be moved by a drag input 504. In response to an input 505 on the icon 503 being received, the processor 120 may change the state 501 to a state 506. In the state 506, the processor 120 may cease, terminate or forgo displaying the icon 503 in response to the input 505, and may display a window 507 partially superimposed on the multimedia content 502. For example, the window 507 may include an executable object 508 for changing the posture of the display 220 of the external electronic device 102 by using an explicit input. According to embodiments, the window 507 may further include at least one other executable object for the screen sharing service. For example, the window 507 may further include at least one of an executable object for zooming in or out the multimedia content 502 displayed on the display 220, or an executable object for disconnecting communication connection between the external electronic device 102 and the electronic device 101, although these objects are not illustrated in FIG. 5. In response to an input 509 on the executable object 508 being received, the processor 120 may transmit posture control information 510 for requesting change of the posture of the display 220 of the external electronic device 102 to the external electronic device 102 by using the communication circuit 191. The external electronic device 102 may receive the posture control information 510. In response to the reception of the posture control information 510, the processor 210 of the external electronic device 102 may control the motor 230 to change the posture of the display 220 of the external electronic device 102. For example, as in a state 511, the processor 210 may change the posture of the display 220 of the external electronic device 102 from the second designated posture to the first designated posture, based on the posture control information 510. In another example, as in a state 512, the processor 210 may change the posture of the display 220 of the external electronic device 102 from the first designated posture to the second designated posture, based on the posture control information 510. However, this should not be considered as limiting.

In an embodiment, the processor 120 may designate a part of a multimedia content displayed on the display 161 of the electronic device 101 or a part of the multimedia content and visual objects displayed on the display 161 of the electronic device 101 as a region of interest (ROI) to be provided to the external electronic device 102. For example, the processor 120 may identify a black bar area displayed black within the multimedia content displayed on the display 161 of the electronic device 101, and may designate a part of the multimedia content from which the black bar area is removed as the ROI. In another example, the processor 120 may designate the multimedia content that corresponds to a main object from among the multimedia content and the visual objects displayed on the display 161 of the electronic device 101 as the ROI. In still another example, the processor 120 may receive a user input for designating a partial area while displaying the multimedia content or the multimedia content and the visual objects on the display 161 of the electronic device 101, and may designate the partial area as the ROI based on the received user input. For example, the user input may be a drag input. When the user input is a drag input, the processor 120 may process a position where the drag input is initially received as a corner of a left upper end of a rectangle, and may process a position where the drag input is finally received as a corner of a right lower end of the rectangle, thereby designating an area corresponding to the rectangle as the ROI.

In an embodiment, in response to the designation of the ROI, the processor 120 may determine a display direction of information (for example, a part of the multimedia content or a part of the multimedia content and the visual objects) in the ROI. For example, the processor 120 may identify an aspect ratio of the ROI, and may determine the display direction of the information based on the identified aspect ratio. In another example, the processor 120 may identify a main object in the information, and may determine the display direction of the information based on a display direction of the identified main object. In still another example, the processor 120 may identify a display direction of a text in the information, and may determine the display direction of the information based on the identified display direction of the text. In yet another example, the processor 120 may identify the display direction of the information based on two or more of the aspect ratio of the ROI, the display direction of the main object, or the display direction of the text.

In an embodiment, the processor 120 may determine the posture of the display 220 of the external electronic device 102 while displaying the information in the ROI on the display 220 to correspond to the display direction of the information. For example, when the display direction of the information is the horizontal direction, the processor 120 may determine the posture of the display 220 of the external electronic device 102 to be the second designated posture. In another example, when the display direction of the information is the vertical direction, the processor 120 may determine the posture of the display 220 of the external electronic device 102 to be the first designated posture. The processor 120 may transmit posture control information for indicating the determined posture by using the communication circuit 191. According to various embodiments, when data for indicating a current posture of the display 220 of the external electronic device 102 is already received from the external electronic device 102, the processor 120 may skip, bypass, defer, or forgo transmitting the posture control information. For example, when the determined posture corresponds to the current posture of the display 220 of the external electronic device 102 identified based on the already received data, the processor 120 may skip, bypass, defer, or forgo transmitting the posture control information. However, this should not be considered as limiting.

In an embodiment, the processor 210 of the external electronic device 102 may receive the posture control information by using the communication circuit 240. The processor 210 may determine whether to change the posture of the display 220 of the external electronic device 102 or whether to maintain the posture of the display 220 of the external electronic device 102, based on the posture control information. For example, when the posture of the display 220 of the external electronic device 102 identified based on the posture control information corresponds to the current posture of the display 220 of the external electronic device 102, the processor 210 may determine to maintain the posture of the display 220 of the electronic device 102. In another example, when the posture of the display 220 of the external electronic device 102 identified based on the posture control information is distinct (or different) from the current posture of the display 220 of the external electronic device 102, the processor 210 may determine to change the posture of the display 220 of the external electronic device 102. Based on the posture of the display 220 of the external electronic device 102 being determined to be changed, the processor 210 may control the motor 230 to change the posture of the display 220 of the external electronic device 102 to the posture of the display 220 of the external electronic device 102 identified based on the posture control information. According to embodiments, the processor 210 may identify whether an external object is positioned on the periphery of the external electronic device 102 (or on the periphery of the display 220 of the external electronic device 102) by using the sensor 250 before changing the posture of the display 220 of the external electronic device 102, and, when the external object is positioned on the periphery of the external electronic device 102, the processor 210 may skip, bypass, defer, or forgo changing the posture of the display 220 of the external electronic device 102. This may be to prevent a damage of the display 220 caused by the external object positioned on the periphery of the external electronic device 102, or a damage of the external object caused by change of the posture of the display 220 of the external electronic device 102. When the posture of the display 220 is set to a posture different from the posture indicated by the posture control information due to the external object, the processor 210 may perform various processing operations. For example, when the posture of the display 220 of the external electronic device 102 is set to the posture different from the posture indicated by the posture control information, the processor 210 may display, on the display 220, information for guiding to place the external object apart from the external electronic device 102 by a designated distance or longer. In another example, when the posture of the display 220 of the external electronic device 102 is set to the posture different from the posture indicated by the posture control information, the processor 210 may transmit, to the electronic device 101 by using the communication circuit 240, a message for indicating that the multimedia content will be displayed in a display direction corresponding to the different posture. However, this should not be considered as limiting.

In an embodiment, after transmitting the posture control information, the processor 120 may transmit, to the external electronic device 102 by using the communication circuit 191, streaming data of the information in the ROI displayed on the display 161 in order to display the information on the display 220 of the external electronic device 102 having the posture determined based on the posture control information. In an embodiment, the streaming data of the information may be obtained by capturing the ROI. In an embodiment, the streaming data of the information may be used to display the multimedia content on the display 220 of the external electronic device 102 in the identified display direction. In an embodiment, the processor 120 may upscale the information in the ROI based on at least one of a size of the ROI or a size of the display area of the display 220, and may obtain the streaming data based on the up-scaled information.

For example, referring to FIG. 6, in a state 601, the processor 120 may receive an input (for example, an input 610 or an input 620) for designating the ROI through the display 161, while displaying a multimedia content 602 and visual objects 603 on the display 161 in the state where the capability data is received. For example, the processor 120 may receive the input 610 for designating the multimedia content 602 from among the multimedia content 602 and the visual objects 603 as the ROI through the display 161. In response to the reception of the input 610, the processor 120 may identify the display direction of the multimedia content 602 included in the ROI. For example, in response to the reception of the input 610, the processor 120 may identify an aspect ratio of the ROI (or an aspect ratio of the multimedia content 602) defined by the input 610, may determine the posture of the display 220 of the external electronic device 102 to be the second designated posture corresponding to the identified aspect ratio, and may transmit posture control information 611 for indicating the determined posture to the external electronic device 102 by using the communication circuit 191. In the state 601, the processor 120 may obtain streaming data 612 by capturing information (for example, an area defined by the input 610) in the ROI designated by the input 610. For example, the processor 120 may up-scale the information in the ROI based on the size of the ROI and the size of the display area of the display 220, and may obtain the streaming data 612 based on the up-scaled information. In another example, the processor 120 may obtain streaming data by capturing the information in the ROI, and may obtain the streaming data 612 by up-scaling the obtained streaming data. After transmitting posture control information 611 or with the posture control information 611, the processor 120 may transmit the streaming data 612 to the external electronic device 102 by using the communication circuit 191. In a state 613, the processor 210 may receive the posture control information 611 by using the communication circuit 240, and may control the motor 230 operably coupled with the display 220 based on the received posture control information 611 to set the posture of the display 220 to the second designated posture. After setting the posture of the display 220 to the second designated posture or while setting the posture of the display 220 to the second designated posture, the processor 210 may display the multimedia content 602 in the ROI defined by the input 610 on the display 220 based on the streaming data 612.

In another example, the processor 120 may receive the input 620 for designating an area without the black bar area in the multimedia content 602 from among the multimedia content 602 and the visual objects 603 as the ROI. In response to the reception of the input 620, the processor 120 may identify the display direction of the multimedia content 602 in the area without the black bar area. For example, in response to the reception of the input 620, the processor 120 may identify an aspect ratio of the ROI defined by the input 620 (or an aspect ratio of the multimedia content 602 in the area without the black bar area), may determine the posture of the display 220 of the external electronic device 102 to be the first designated posture corresponding to the identified aspect ratio, and may transmit posture control information 614 for indicating the determined posture to the external electronic device 102 by using the communication circuit 191. In the state 601, the processor 120 may obtain streaming data 615 (for example, the streaming data 615 obtained by capturing the area defined by the input 620) of the information (for example, the multimedia content 602 with the black bar area being removed) in the ROI designated by the input 620. For example, the processor 120 may up-scale the information in the ROI, based on a size of the ROI and a size of the display area of the display 220, and may obtain the streaming data 615 based on the up-scaled information. After transmitting the posture control information 614 or with the posture control information 614, the processor 120 may transmit the streaming data 615 to the external electronic device 102 by using the communication circuit 191. In a state 616, the processor 210 may receive the posture control information 614 by using the communication circuit 240, and may control the motor 230 operably coupled with the display 220 based on the received posture control information 614 to set the posture of the display 220 to the first designated posture. After setting the posture of the display 220 to the first designated posture or while setting the posture of the display 220 to the first designated posture, the processor 210 may display the multimedia content 602 in the ROI defined by the input 620 on the display 220 based on the streaming data 615.

In still another example, while displaying the multimedia content 602 and the visual objects 603 on the display 161 with the capability data being received in the state 601, the processor 120 may receive the input 610 through the display 161. For example, unlike in FIG. 6, the processor 120 may identify that the black bar area is included in the ROI defined by the input 610 in response to the input 610 being received, may adjust the ROI to remove the black bar area, and may identify an aspect ratio of the adjusted ROI or may identify an aspect ratio of the multimedia content 602 in the area without the black bar area in the ROI defined by the input 610. The processor 120 may determine the posture of the display 220 of the external electronic device 102 based on the identified aspect ratio, and may transmit posture control information for indicating the determined posture to the external electronic device 102 by using the communication circuit 191. In this case, the processor 120 may obtain the streaming data 615 independently from the reception of the input 610. For example, the processor 120 may obtain the streaming data 615 including the information in the adjusted ROI or information included in the area without the black bar area in the ROI defined by the input 610.

In one or more embodiments, the processor 120 may transmit address information for the external electronic device 102 to access the multimedia content stored in the electronic device 101, instead of transmitting the streaming data based on the captured screen as exemplified through descriptions of FIGS. 3, 4, 5 and 6, in order to provide the screen sharing service with the external electronic device 102. For example, the processor 120 may transmit the address information to the external electronic device 102 by using the communication circuit 191 in order to provide the screen sharing service with the external electronic device 102 in a file sharing method. For example, the processor 120 may transmit the address information instead of transmitting the streaming data based on allshare or digital living network alliance (DLNA). In one or more embodiments, selection of one transmission of the transmission of the streaming data and the transmission of the address information may be executed based on a user input, or may be executed based on context information of the electronic device 101. For example, when displaying of the multimedia content on the display 161 of the electronic device 101 is restricted due to another task executed in the electronic device 101, the processor 120 may cease the transmission of the streaming data and may transmit the address information, such that the screen sharing service can be maintained even when the multimedia content is replayed in a background state. In another example, when a load of the electronic device 101 exceeds a reference range, the processor 120 may cease the transmission of the streaming data and may transmit the address information, such that the load of the electronic device 101 can be reduced.

For example, referring to FIG. 7, in a state 701, the processor 120 may transmit streaming data 702 of a screen including a multimedia content to the external electronic device 102 by using the communication circuit 191 for the sake of the screen sharing service. In a state 704, the processor 210 of the external electronic device 102 may receive the streaming data 702 by using the communication circuit 240, and may display the multimedia content 706 displayed within the electronic device 101 on the display 220 based on the received streaming data 702.

In an embodiment, in the state 701, the processor 120 may transmit address information 703 for the external electronic device 102 to access the multimedia content to the external electronic device 102 by using the communication circuit 191 for the sake of the screen sharing service. In a state 705, the processor 210 may receive the address information 703 by using the communication circuit 240, and may access a multimedia content 706 stored in the electronic device 101 based on the address information 703, such that the multimedia content 706 can be displayed on the display 220. In one or more embodiments, the embodiment illustrated in FIG. 7 may be executed with the embodiments exemplified through descriptions of FIGS. 3, 4, 5, and 6. In one or more embodiments, when the external electronic device 102 receives the address information 703 from the electronic device 101, the processor 210 of the external electronic device 102 may not receive the posture control information from the electronic device 101, may obtain the multimedia content based on the access to the multimedia content stored in the electronic device 101, and may analyze the obtained multimedia content, unlike in the descriptions of FIGS. 3, 4, 5, and 6. The processor 210 may determine an optimal posture of the display 220 for displaying the multimedia content on the display 220 based on the analysis, and may display the multimedia content on the display 220 having the posture determined by the processor 210.

As described above, when the electronic device 101 according to one or more embodiments provides the screen sharing service by interlocking with the external electronic device 102 which may change the posture of the display 220, the electronic device 101 may determine the posture of the display 220 of the external electronic device 102, based on at least one of the display direction of the multimedia content, the posture of the electronic device 102, or the display direction of the information in the ROI, and may obtain streaming data of the screen including the multimedia content to correspond to the determined posture and may transmit the streaming data. Alternatively, when the electronic device 101 according to one or more embodiments provides the screen sharing service by interlocking with the external electronic device 102 which may change the posture of the display 220, the electronic device 101 may transmit address information for the external electronic device 102 to access the multimedia content to the external electronic device 102. The electronic device 101 according to one or more embodiments can provide an enhanced user experience, an enhanced screen sharing service, and an intuitive screen sharing service through the above-described operations. The electronic device 101 according to one or more embodiments may adaptively provide a transmission method of a source (for example, a multimedia content) provided for the screen sharing service, according to a context or a user input, such that an enhanced user experience, an enhanced screen sharing service, and an intuitive screen sharing service can be provided.

As described above, an electronic device (for example, the electronic device 101) according to one or more embodiments may include: at least one memory (for example, the memory 130) configured to store instructions; a first display (for example, the display 161); a communication circuit (for example, the communication circuit 191); and at least one processor (for example, the processor 120), and when executing the instructions, the at least one processor may be configured to: while displaying a multimedia content on the first display, receive capability data of an external electronic device (for example, the external electronic device 102) for indicating that change of a posture of a second display (for example, the display 220) of the external electronic device is available, by using the communication circuit; based on the reception of the capability data, determine a posture of the second display corresponding to a display direction of the multimedia content; transmit posture control information for indicating the determined posture to the external electronic device by using the communication circuit; and transmit streaming data of a screen including the multimedia content displayed on the first display to the external electronic device by using the communication circuit in order to display the screen including the multimedia content on the second display having the posture determined based on the posture control information.

In an embodiment, when executing the instructions, the at least one processor may be configured to: while displaying the multimedia content on the first display, detect an input of requesting to display the multimedia content on the second display; based on the detection, identify whether the multimedia content is displayed on an entire display area of the first display; and, based on it being identified that the multimedia content is displayed on the entire display area of the first display, determine the posture of the second display corresponding to the display direction of the multimedia content.

In an embodiment, the electronic device may further include a sensor (for example, the sensor 176a), and when executing the instructions, the at least one processor may further be configured to determine the posture of the second display corresponding to a posture of the electronic device that is identified through the sensor, based on it being identified that the multimedia content is displayed on a partial display area of the first display.

In an embodiment, when executing the instructions, the at least one processor may be configured to: based on the reception of the capability data, determine whether a posture control mode in which the electronic device controls the posture of the second display is in an enabled state; and, based on it being identified that the posture control mode is in the enabled state, determine the posture of the second display corresponding to the display direction of the multimedia content.

In an embodiment, when executing the instructions, the at least one processor may further be configured to: based on it being identified that the posture control mode is in a disabled state, bypass determining the posture of the second display corresponding to the display direction of the multimedia content, and to display an icon floating on the multimedia content while displaying the multimedia content on the first display; in response to an input on the icon being received, display an executable object for determining the posture of the second display within a window partially superimposed on the multimedia content; and, in response to an input on the executable object being received, determine the posture of the second display corresponding to the input on the executable object.

In an embodiment, when executing the instructions, the at least one processor may be configured to: while displaying the multimedia content on the first display, receive an input for designating a partial area of a display area of the multimedia content; in response to the reception of the input, determine a display direction of a part of the multimedia content included in the partial area; and determine the posture of the second display corresponding to the display direction of the part of the multimedia content.

In an embodiment, when executing the instructions, the at least one processor may be configured to: up-scale the part of the multimedia content based on a size of a display area of the second display; obtain the streaming data based on the up-scaled part of the multimedia content; and transmit the streaming data to the external electronic device by using the communication circuit.

In an embodiment, the posture control information may be transmitted from the electronic device to the external electronic device to set the posture of the second display to a first designated posture or a second designated posture, based on control of a motor of the external electronic device connected with the second display.

In an embodiment, when executing the instructions, the processor may be configured to: transmit a signal requesting the capability data of the external electronic device to the external electronic device by using the communication circuit; and, in response to the signal, receive the capability data from the external electronic device by using the communication circuit.

In an embodiment, the communication circuit may include a wireless fidelity (WiFi) communication circuit, the signal requesting the capability data may be transmitted from the electronic device to the external electronic device through an RTSP M3 request message, the capability data may be received at the electronic device from the external electronic device through an RTSP M3 response message, and the posture control information may be transmitted to the external electronic device through an RTSP M4 request message.

In an embodiment, when executing the instructions, the at least one processor may further be configured to, when the electronic device provides a screen sharing service regarding the multimedia content based on digital living network alliance (DLNA), transmit address information for the external electronic device to access the multimedia content stored in the electronic device to the external electronic device by using the communication circuit, instead of transmitting the streaming data of the screen including the multimedia content by using the communication circuit.

As described above, an electronic device (for example, the electronic device 101) according to one or more embodiments may include: at least one memory (for example, the memory 130) configured to store instructions; a first display (for example, the display 161); a communication circuit (for example, the communication circuit 191); and at least one processor (for example, the processor 120), and, when executing the instructions, the at least one processor may be configured to: while displaying a first multimedia content on the first display in a first display direction, transmit first streaming data of a screen including the first multimedia content to an external electronic device (for example, the external electronic device 102) by using the communication circuit in order to display the first multimedia content on a second display (for example, the display 220) of the external electronic device; receive an input for changing the first multimedia content displayed on the first display to a second multimedia content; identify a display direction of the second multimedia content based on the reception of the input; when the identified display direction is a second display direction which is distinct from the first display direction, obtain posture control information for changing a posture of the second display based on the second display direction; transmit the posture control information to the external electronic device by using the communication circuit; and transmit second streaming data of a screen including the second multimedia content displayed on the first display to the external electronic device by using the communication circuit in order to display the second multimedia content on the second display having the posture changed based on the posture control information.

In an embodiment, when executing the instructions, the at least one processor may further be configured to: when the identified display direction is the first display direction, forgo the transmission of the posture control information to maintain the posture of the second display displaying the first multimedia content based on the first streaming data; and transmit the second streaming data of the second multimedia content displayed on the first display to the external electronic device by using the communication circuit in order to display the second multimedia content on the second display having the maintained posture.

In an embodiment, when executing the instructions, the at least one processor may be configured to: in response to the reception of the input, identify whether to display the second multimedia content on an entire display area of the first display; and, in response to it being identified that the second multimedia content is displayed on the entire display area of the first display, obtain the posture control information based on the second display direction.

In an embodiment, the electronic device may further include a sensor (for example, the sensor 176a), and when executing the instructions, the at least one processor may further be configured to obtain the posture control information for changing the posture of the second display, based on a posture of the electronic device identified through the sensor, in response to it being identified that the second multimedia content is displayed on a partial display area of the first display.

In an embodiment, when executing the instructions, the at least one processor may further be configured to, when a posture control mode in which the electronic device controls the posture of the second display is in a disabled state, forgo the transmission of the posture control information to maintain the posture of the second display displaying the first multimedia content based on the first streaming data, independently from that the identified display direction is the second display direction.

In an embodiment, when executing the instructions, the processor may further be configured to: when the posture control mode is in the disabled state, display an icon floating on the second multimedia content while displaying the second multimedia content on the first display; in response to an input on the icon being received, display an executable object for determining the posture of the second display within a window partially superimposed on the second multimedia content; and, in response to an input on the executable object being received, obtain the posture control information for changing the posture of the second display, based on a direction indicated by the input on the executable object.

In an embodiment, the second display may be rotated by 90 degrees in response to reception of the posture control information from the electronic device.

Figure 8:
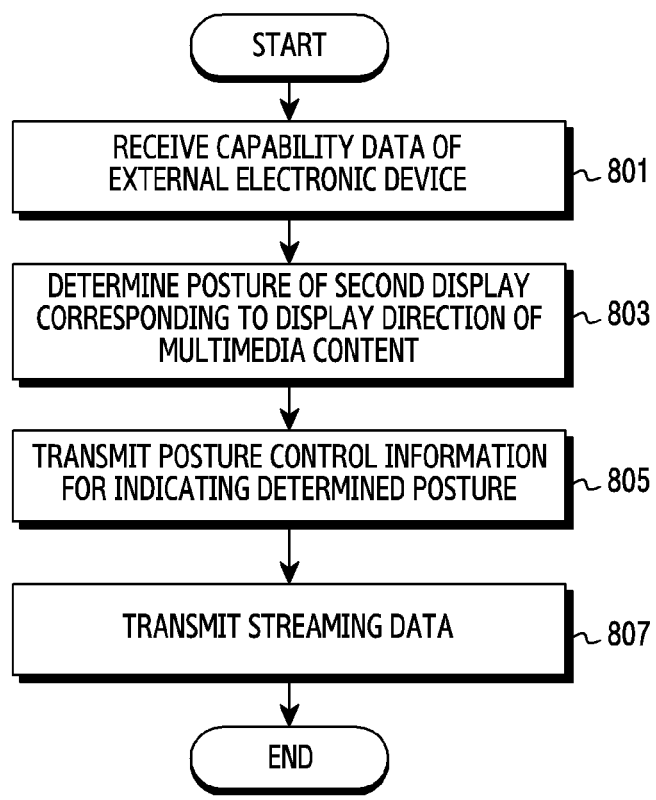
FIG. 8 is a flowchart illustrating a method for transmitting posture control information to an external electronic device according to one or more embodiments.

FIG. 8 is a flowchart illustrating a method for transmitting posture control information to an external electronic device according to one or more embodiments.

According to one or more embodiments, this method may be executed by the electronic device 101 shown in FIG. 1 or 2 or the processor 120 of the electronic device 101.

Referring to FIG. 8, in operation 801, the processor 120 according to an embodiment may receive capability data of the external electronic device 102 for indicating that the change of the posture of the display 220 (hereinafter, referred to as a second display) of the external electronic device 102 is available, by using the communication circuit 191, while displaying a multimedia content on the display 161 (hereinafter, referred to as a first display). For example, the processor 120 may transmit a signal for requesting the capability data of the external electronic device 102 to the external electronic device 102 by using the communication circuit 191, and may receive the capability data from the external electronic device 102 by using the communication circuit 191 in response to the signal. However, this should not be considered as limiting. For example, the capability data may be the capability data defined through descriptions of FIG. 2. In one or more embodiments, the capability data may be received before communication connection is established between the electronic device 101 and the external electronic device 102 for the sake of the screen sharing service, or after the communication connection is established.

According to an embodiment, in operation 803, the processor 120 may determine a posture of the second display corresponding to a display direction of the multimedia content displayed on the first display. For example, based on the reception of the capability data, the processor 120 may identify a display direction of a screen displayed on the display 161 of the electronic device 101 and/or a display direction of the multimedia content, and may determine the posture of the display 220 of the external electronic device 102 corresponding to the identified display direction. For example, the processor 120 may identify the display direction of the multimedia content, based on information regarding a size of the multimedia content included in metadata regarding the multimedia content. In another example, the processor 120 may identify the display direction of the multimedia content based on information regarding an aspect ratio of the multimedia content included in the metadata. For example, when the aspect ratio of the multimedia content is 16:9, the processor 120 may identify that the display direction of the multimedia content is the horizontal direction, and, when the aspect ratio of the multimedia content is 9:16, the processor 120 may identify that the display direction of the multimedia content is the vertical direction. According to various embodiments, the metadata may be included in a file including the multimedia content, or may be included in another file which is distinct from the file including the multimedia content and is associated with the file. In still another example, the processor 120 may identify a main object from the multimedia content, and may identify the display direction of the multimedia content based on a display direction of the identified main object. In yet another example, the processor 120 may identify a text from the multimedia content, and may identify the display direction of the multimedia content based on a display direction of the identified text. In further example, the processor 120 may identify the display direction of the multimedia content based on two or more of the information regarding the size of the multimedia content in the metadata, the information regarding the aspect ratio of the multimedia content in the metadata, the display direction of the main object in the multimedia content, or the display direction of the text in the multimedia content.

According to an embodiment, the processor 120 may determine the posture of the second display based on the determined display direction. For example, when the determined display direction is the horizontal direction, the processor 120 may determine the posture of the second display to be the second designated posture for providing the landscape mode. In another example, when the determined display direction is the vertical direction, the processor 120 may determine the posture of the second display to be the first designated posture for providing the portrait mode.

According to an embodiment, in operation 805, the processor 120 may transmit posture control information for indicating the determined posture. For example, the posture control information may be transmitted from the electronic device 101 to the external electronic device 102 to set the posture of the second display to the first designated posture or the second designated posture based on control of the motor 230 of the external electronic device 102 connected with the second display. For example, the posture control information may be formed 1 bit long to indicate a designated posture selected by the electronic device 101 from the first designated posture and the second designated posture. However, this should not be considered as limiting. According to embodiments, the posture control information may be implicitly indicated by using streaming data, which will be described below through descriptions of operation 807, without being transmitted as in operation 805. For example, when the streaming data includes information for displaying the multimedia content in the horizontal direction, the posture control information may be indicated for the external electronic device 102 by the streaming data. In another example, when the streaming data includes information for displaying the multimedia content in the vertical direction, the posture control information may be indicated for the external electronic device 102 by the streaming data. However, this should not be considered as limiting.

According to an embodiment, in operation 807, the processor 120 may transmit, to the external electronic device 102 by using the communication circuit 191, streaming data of a screen including the multimedia content displayed on the first display in order to display the multimedia content on the second display having the posture determined based on the posture control information. For example, the streaming data may be obtained by capturing the screen including the multimedia content. For example, the streaming data may be transmitted in response to a request of the external electronic device 102 which receives the posture control information, may be transmitted along with the posture control information, or may be transmitted after a designated time after the posture control information is transmitted.

According to an embodiment, the processor 210 of the external electronic device 102 may receive the posture control information, may set the posture of the second display based on the posture control information, and may display the multimedia content on the second display having the set posture based on the streaming data.

As described above, the electronic device 101 according to one or more embodiments may change the posture of the second display to correspond to the display direction of the multimedia content provided to the external electronic device 102 from the electronic device 101 for the sake of the screen sharing service, without a separate explicit input for changing the posture of the second display of the external electronic device 102, such that an enhanced screen sharing service can be provided.

Figure 9:
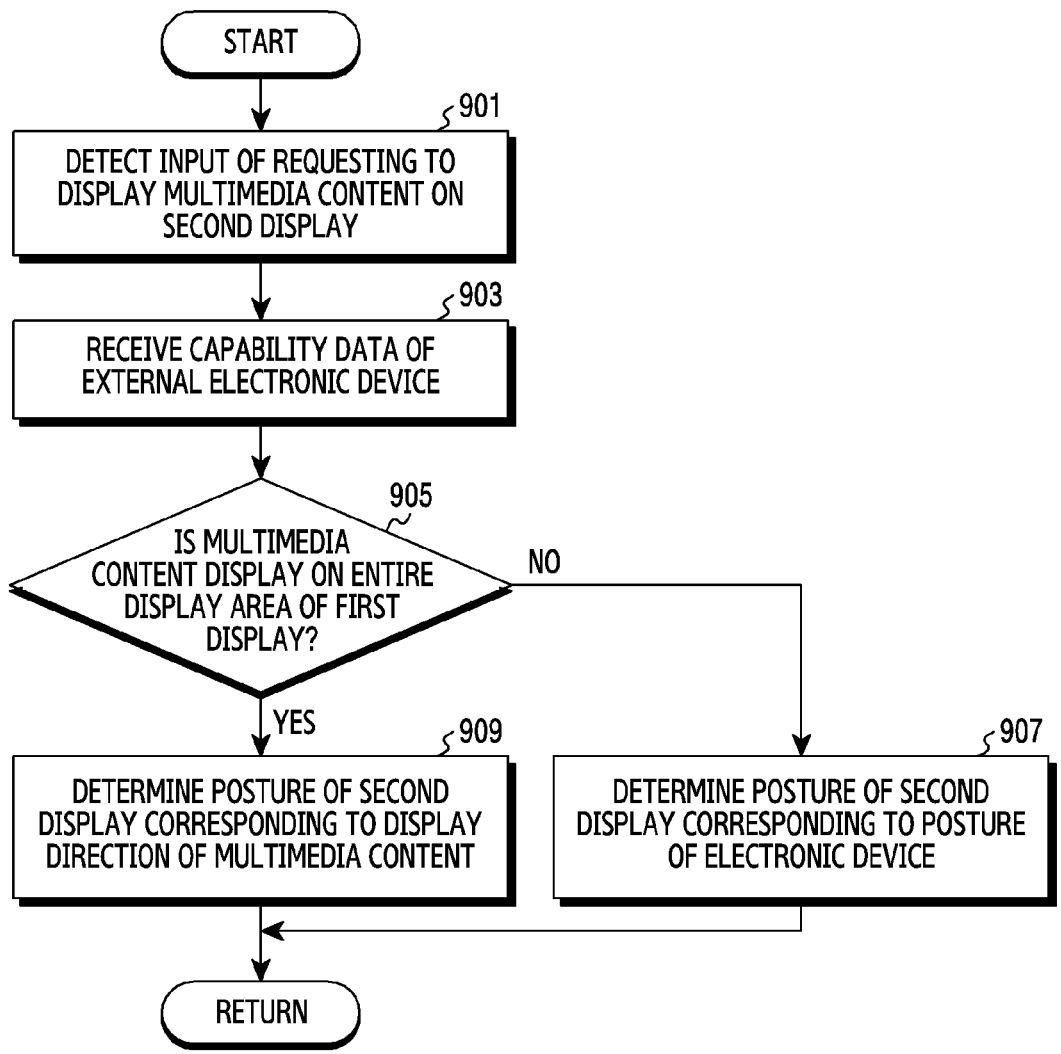
FIG. 9 is a flowchart illustrating a method for determining a posture of a second display of the external electronic device according to one or more embodiments.

FIG. 9 is a flowchart illustrating a method for determining a posture of the second display of the external electronic device according to one or more embodiments.

According to one or more embodiments, this method may be executed by the electronic device 101 shown in FIG. 1 or 2, or the processor 120 of the electronic device 101.

Operations 901 to 909 of FIG. 9 may be related to operations 801 and 803 of FIG. 8.

Referring to FIG. 9, in operation 901, the processor 120 according to an embodiment may detect an input of requesting a multimedia content to be displayed on the second display. For example, the processor 120 may detect a touch input on an executable object displayed along with the multimedia content as the input of requesting the multimedia content to be displayed on the second display, while displaying the multimedia content on the first display. In another example, in response to an input of invoking a quick panel being received while displaying the multimedia content on the first display, the processor 120 may display the quick panel on at least a part of the multimedia content, and may detect a touch input on an executable object included in the quick panel as the input of requesting the multimedia content to be displayed on the second display.

According to an embodiment, in operation 903, the processor 120 may receive the capability data of the external electronic device 102 from the external electronic device 102 based on the detection. For example, in response to the detection, the processor 120 may perform operations for establishing communication connection with the external electronic device 102. The processor 120 may receive the capability data from the external electronic device 102 while performing the operations or after performing the operations. For example, the capability data may be received according to a request of the electronic device 101, or may be received based on a protocol predefined between the electronic device 101 and the external electronic device 102 without a request of the electronic device 101. For example, operation 903 may correspond to operation 801 of FIG. 8.

According to an embodiment, in operation 905, the processor 120 may identify whether the multimedia content is displayed on an entire display area of the first display. For example, when the multimedia content is displayed on the entire display area of the first display, the processor 120 may perform operation 909, but otherwise, the processor 120 may perform operation 907.

According to an embodiment, in operation 907, the processor 120 may determine a posture of the second display corresponding to a posture of the electronic device 101, based on it being identified that the multimedia content is displayed on a part of the entire display area of the first display. For example, the processor 120 may determine the posture of the second display of the external electronic device 102 while displaying the multimedia content provided from the electronic device 101 as the posture of the second display corresponding to the posture of the electronic device 101.

According to an embodiment, in operation 909, the processor 120 may determine a posture of the second display corresponding to a display direction of the multimedia content, based on it being identified that the multimedia content is displayed on the entire display area of the first display. For example, operation 909 may correspond to operation 803 of FIG. 8.

As described above, the electronic device 101 according to one or more embodiments may determine the posture of the second display differently according to whether the multimedia content provided to the external electronic device 102 is displayed on the entire display area of the first display. Through this determination, the electronic device 101 according to one or more embodiments can provide an enhanced screen sharing service.

Figure 10:
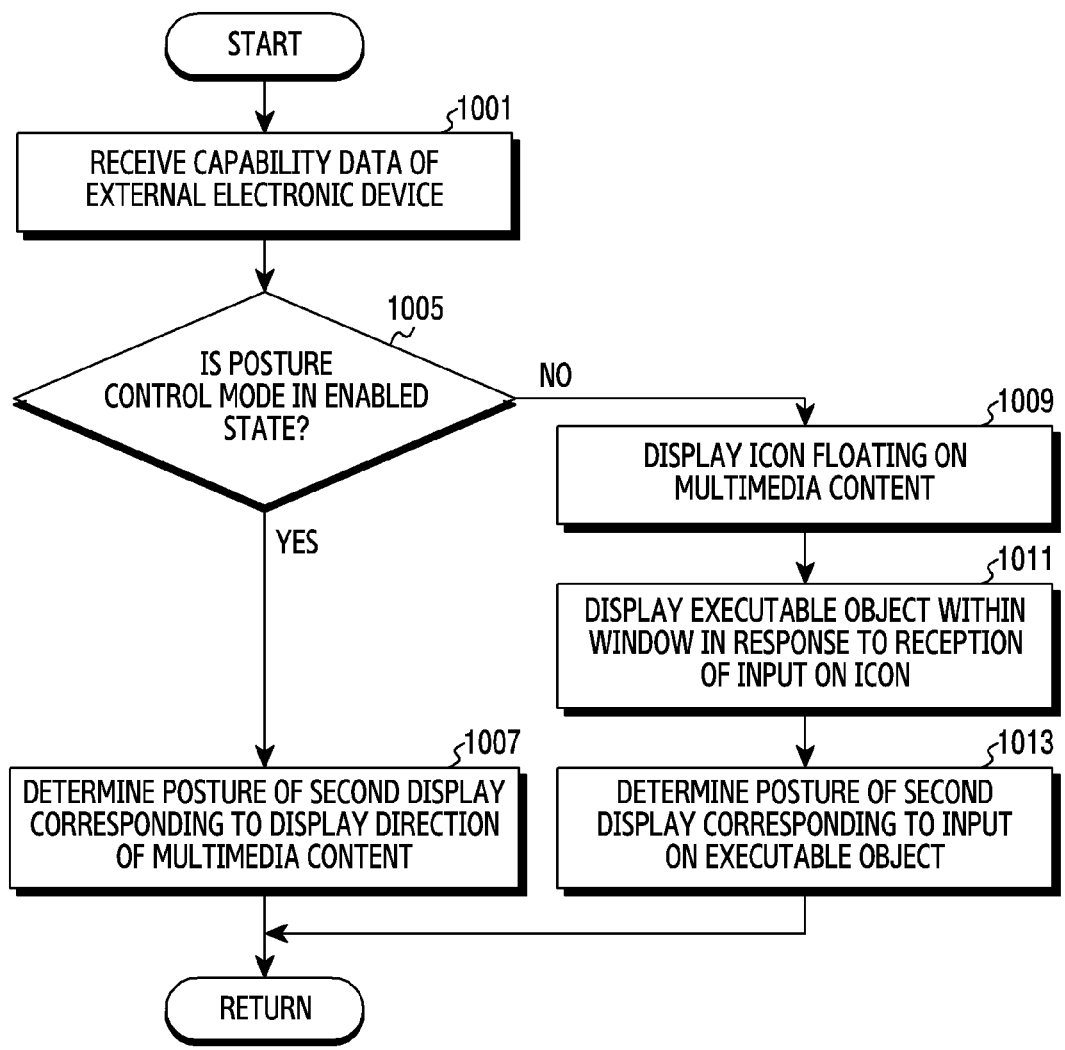
FIG. 10 is a flowchart illustrating a method for determining the posture of the second display according to one or more embodiments.

FIG. 10 is a flowchart illustrating a method for determining the posture of the second display according to one or more embodiments. According to one or more embodiments, this method may be executed by the electronic device 101 shown in FIG. 1 or 2 or the processor 120 of the electronic device 101.

Operations 1001 to 1013 of FIG. 10 may be related to operations 801 and 803 of FIG. 8.

Referring to FIG. 10, in operation 1001, the processor 120 according to an embodiment may receive the capability data of the external electronic device 102 from the external electronic device 102. For example, operation 1001 may correspond to operation 801 of FIG. 8.

According to an embodiment, in operation 1005, the processor 120 may identify whether a posture control mode in which the electronic device 101 controls the posture of the second display of the external electronic device 102 for the sake of the screen sharing service is in an enabled state, after receiving the capability data. For example, the posture control mode may refer to a mode in which the posture of the display 220 of the external electronic device 102 is controlled based on a posture of the electronic device 101 and/or a direction of the multimedia content, without an explicit input for changing the posture of the display 220 of the external electronic device 102. For example, when the posture control mode is in the enabled state, the processor 120 may perform operation 1007, but otherwise, the processor 120 may perform operation 1009.

According to an embodiment, in operation 1007, the processor 120 may determine the posture of the second display corresponding to the display direction of the multimedia content, based on it being identified that the posture control mode is in the enabled state.

According to an embodiment, in operation 1009, the processor 120 may display an icon floating on the multimedia content while displaying the multimedia content on the first display, based on it being identified that the posture control mode is in a disabled state. In one or more embodiments, the icon may be moved by a drag input.

According to an embodiment, in operation 1011, the processor 120 may display an executable object for determining (or changing) the posture of the second display within a window partially superimposed on the multimedia content, in response to reception of an input on the icon. In one or more embodiments, the window may further display at least one other executable object along with the executable object. For example, the at least one other executable object may be used to execute various functions related to the screen sharing service. For example, the at least one other executable object may include at least one of an executable object for zooming in or out the multimedia content, an executable object for disconnecting from the external electronic device 102, or an executable object for changing the method of providing the multimedia content from a streaming method to a file sharing method.

According to an embodiment, in operation 1013, the processor 120 may determine the posture of the second display corresponding to an input on the executable object in response to reception of the input on the executable object. For example, when the posture of the second display is the first designated posture for providing the portrait mode, the processor 120 may determine the posture of the second display to be the second designated posture for providing the landscape mode. In another example, when the posture of the second display is the second designated posture, the processor 120 may determine the posture of the second display to be the first designated posture.

As described above, when the posture control mode is disabled, the electronic device 101 according to one or more embodiments may display the floating icon that can be easily accessed by the user, along with the multimedia content, and may determine the posture of the second display based on an input on the floating icon, such that high convenience can be provided in the screen sharing service.

Figure 11:
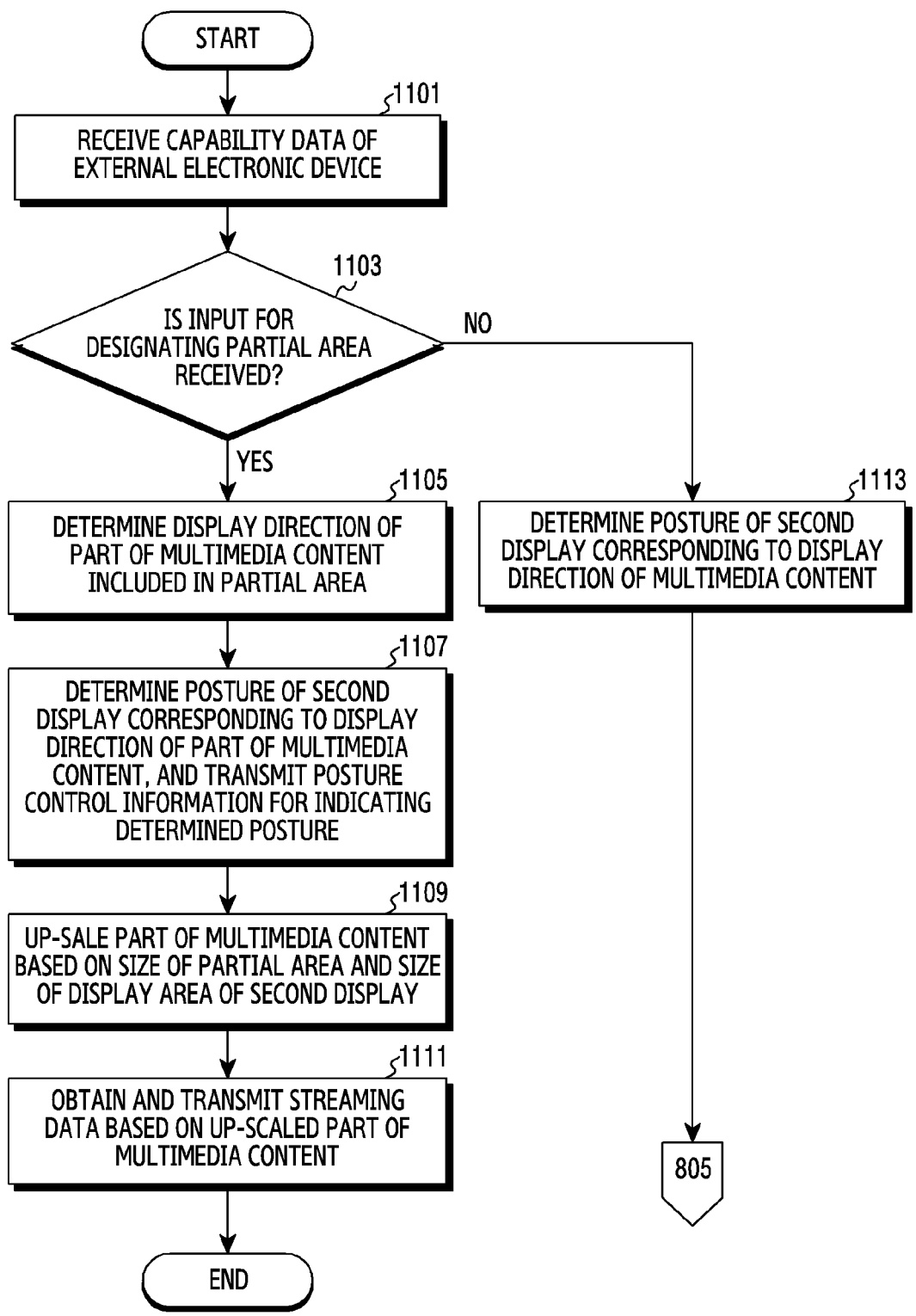
FIG. 11 is a flowchart illustrating a method for transmitting streaming data according to one or more embodiments.

FIG. 11 is a flowchart illustrating a method for transmitting streaming data according to one or more embodiments. According to one or more embodiments, this method may be executed by the electronic device 101 shown in FIG. 1 or 2, or the processor 120 of the electronic device 101.

Operations 1101 to 1113 of FIG. 11 may be related to operations 801, 803 of FIG. 8.

Referring to FIG. 11, in operation 1101, the processor 120 according to an embodiment may receive capability data of the external electronic device 102 from the external electronic device 102. For example, operation 1101 may correspond to operation 801 of FIG. 8.

According to an embodiment, in operation 1103, the processor 120 may receive an input for designating a partial area of a display area of the multimedia content while displaying the multimedia content on the first display after receiving the capability data. For example, the partial area may be an ROI. When the input for designating the partial area is received, the processor 120 may perform operation 1105, but otherwise, the processor 120 may perform operation 1113.

According to an embodiment, in operation 1105, the processor 120 may determine a display direction of a part of the multimedia content included in the partial area in response to the input for designating the partial area being received. For example, the processor 120 may identify the display direction of the part of the multimedia content based on an aspect ratio of the part of the multimedia content. For example, when the aspect ratio of the part of the multimedia content is 21:9, the processor 120 may identify that the display direction of the multimedia content is the horizontal direction, and, when the aspect ratio of the part of the multimedia content is 9:21, the processor 120 may identify that the display direction of the part of the multimedia content is the vertical direction. In another example, the processor 120 may identify a main object from the part of the multimedia content, and may identify the display direction of the part of the multimedia content based on a display direction of the identified main object. In still another example, the processor 120 may identify a text from the part of the multimedia content, and may identify the display direction of the part of the multimedia content based on a display direction of the identified text. In yet another example, the processor 120 may identify the display direction of the part of the multimedia content, based on two or more of the aspect ratio of the part of the multimedia content, the display direction of the main object in the part of the multimedia content, or the display direction of the text in the part of the multimedia content.

According to an embodiment, in operation 1107, the processor 120 may determine a posture of the second display corresponding to the display direction of the part of the multimedia content, and may transmit posture control information for indicating the determined posture to the external electronic device 102.

According to an embodiment, in operation 1109, the processor 120 may up-scale the part of the multimedia content designated by the input, based on a size of the partial area designated by the input and a size of the display area of the second display.

According to an embodiment, in operation 1111, the processor 120 may obtain streaming data based on the part of the multimedia content that is up-scaled, and may transmit the obtained streaming data. For example, the streaming data may be obtained by capturing the part of the multimedia content.

According to an embodiment, in operation 1113, the processor 120 may determine the posture of the second display corresponding to the display direction of the multimedia content, based on non-reception of the input. For example, operation 1113 may correspond to operation 803 of FIG. 8. The processor 120 may perform operation 805 after performing operation 1113.

As described above, the electronic device 101 according to one or more embodiments may determine the display direction of the part of the multimedia content based on the input for designating the part of the multimedia content to be shared by the external electronic device 102, and may determine the posture of the second display displaying the part of the multimedia content to correspond to the determined display direction, such that an enhanced screen sharing service can be provided.

Figure 12:
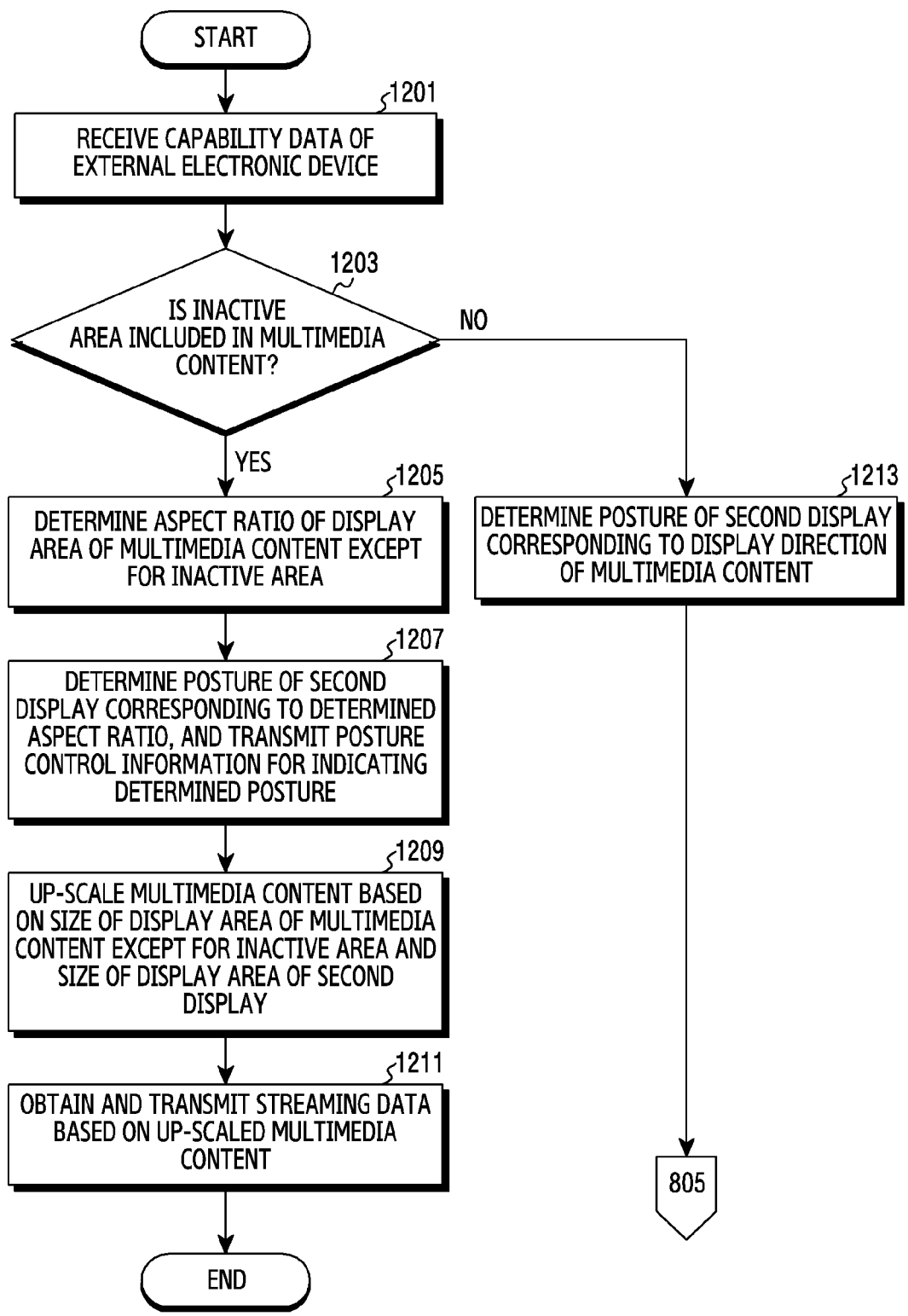
FIG. 12 is a flowchart illustrating a method for determining the posture of the second display according to one or more embodiments.

FIG. 12 is a flowchart illustrating a method for determining the posture of the second display according to one or more embodiments. According to one or more embodiments, this method may be executed by the electronic device 101 shown in FIG. 1 or 2 or the processor 120 of the electronic device 101.

Operations 1201 to 1213 of FIG. 12 may be related to operations 801, 803 of FIG. 8.

Referring to FIG. 12, in operation 1201, the processor 120 according to an embodiment may receive capability data of the external electronic device 102 from the external electronic device 102. For example, operation 1201 may correspond to operation 801 of FIG. 8.

According to an embodiment, in operation 1203, the processor 120 may identify whether an inactive area is included in the multimedia content displayed on the first display after receiving the capability data. For example, the inactive area may refer to an area that does not change a scene while the multimedia content is being replayed, and is displayed black. For example, the inactive area may be at least one black bar area that surrounds at least a part of peripheries of an active area of the multimedia content. When the inactive area is included in the multimedia content, the processor 120 may perform operation 1205, but otherwise, the processor 120 may perform operation 1213.

According to an embodiment, in operation 1205, the processor 120 may determine an aspect ratio of a display area of the multimedia content except for the inactive area, based on it being identified that the inactive area is included in the multimedia content.

According to an embodiment, in operation 1207, the processor 120 may determine the posture of the second display corresponding to the determined aspect ratio, and may transmit posture control information for indicating the determined posture.

According to an embodiment, in operation 1209, the processor 120 may up-scale the multimedia content based on a size of the display area of the multimedia content except for the inactive area and a size of the display area of the second display.

According to an embodiment, in operation 1211, the processor 120 may obtain streaming data based on the up-scaled multimedia content, and may transmit the obtained streaming data to the external electronic device 102.

According to an embodiment, in operation 1213, the processor 120 may determine the posture of the second display corresponding to the display direction of the multimedia content, based on it being identified that the inactive area is not included in the multimedia content. For example, operation 1213 may correspond to operation 803 of FIG. 8. The processor 120 may perform operation 805 after performing operation 1213.

As described above, the electronic device 101 according to one or more embodiments may exclude the inactive area in the multimedia content without receiving a separate input when the inactive area is included in the multimedia content, and may determine the posture of the second display based on the display area of the multimedia content from which the inactive area is removed, such that an enhanced screen sharing service can be provided.

Figure 13:
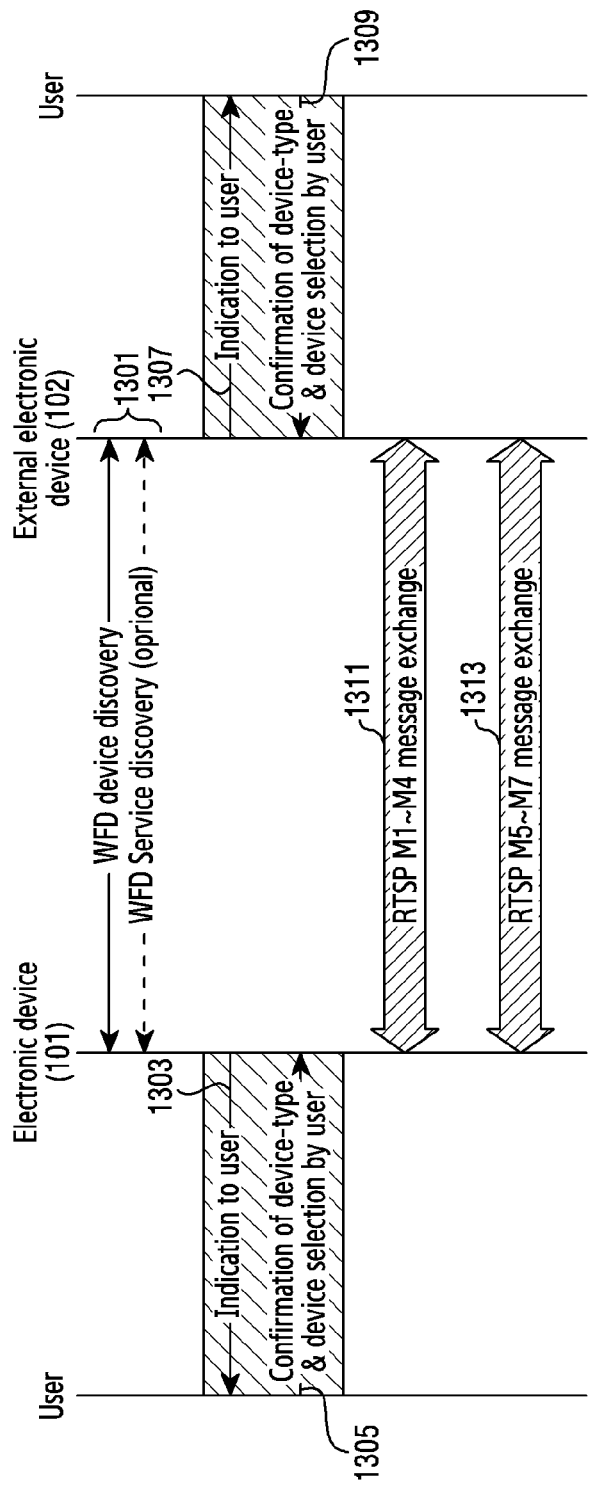
FIG. 13 is a system view illustrating signaling between an electronic device and an external electronic device according to an embodiment.

FIG. 13 is a system view illustrating signaling between an electronic device and an external electronic device according to an embodiment. According to one or more embodiments, the signaling may be executed by the electronic device 101 and the external electronic device 102 shown in FIG. 1 or 2.

Although not illustrated in description of FIG. 13, contents of clauses 4.6 and 4.8 of the Wi-Fi direct (WFD) standards, and contents of the WFD standards citing clauses 4.6 and 4.8 may be incorporated herein.

Referring to FIG. 13, in operation 1301, each of the electronic device 101 and the external electronic device 102 according to an embodiment may execute WFD device discovery. For example, each of the electronic device 101 and the external electronic device 102 may execute WFD device discovery in order for the other electronic device to discover the electronic device 101 and the external electronic device 102, respectively. According to embodiments, each of the electronic device 101 and the external electronic device 102 may further execute WFD service discovery to inform of the existence of the WFD service.

According to an embodiment, in operation 1303, the electronic device 101 may provide an indication to inform a user of the existence of the external electronic device 102, based on operation 1301.

According to an embodiment, in operation 1305, the electronic device 101 may detect a user input indicating a device-type (for example, a source device or a sink device) and a device selection, which is received based on the indication.

According to an embodiment, in operation 1307, the external electronic device 102 may provide an indication to inform the user of the existence of the electronic device 101 based on operation 1301.

According to an embodiment, in operation 1309, the external electronic device 102 may detect a user input indicating a device-type and a device selection, which is received based on the indication.

According to embodiments, operations including operations 1303 and 1305 and operations including operations 1307 and 1309 may be selectively performed.

According to an embodiment, in operation 1311, the electronic device 101 and the external electronic device 102 may exchange real time streaming protocol (RTSP) M1-M4 messages as a negotiation procedure for the screen sharing service. For example, the electronic device 101 may request capability data of the external electronic device 102 through an RTSP M3 request message to identify capability of the external electronic device 102. For example, in response to the RTSP M3 request message, the external electronic device 102 may transmit an RTSP M3 response message to the electronic device 101. In one or more embodiments, the RTSP M3 response message may include the capability data for indicating that the change of the posture of the second display of the external electronic device 102 is available. The capability data may further include additional information described through FIG. 2. The electronic device 101 may identify that the change of the posture of the second display of the external electronic device 102 is available through the RTSP M3 response message, and may recognize a state of being capable of transmitting the posture control information, based on the identification. Based on the recognition, the electronic device 101 may transmit, to the external electronic device 102, the posture control information for indicating the posture of the second display for the screen sharing service, determined by the electronic device 101, through an RTSP M4 request message. The external electronic device 102 may obtain the posture control information from the electronic device 101 by receiving the RTSP M4 request message.

According to an embodiment, in operation 1313, the electronic device 101 and the external electronic device 102 may exchange RTSP M5-M7 messages as a negotiation procedure for completing establishment of an WFD session between the electronic device 101 and the external electronic device 102. For example, the electronic device 101 may transmit an RTSP M5 request message for triggering an RTSP setup to the external electronic device 102, and the external electronic device 102 may transmit an RTSP M5 response message to the electronic device 101 in response to the RTSP M5 request message. The external electronic device 102 which transmits the RTSP M5 response message may transmit an RTSP M6 request message for an RTSP setup, and the electronic device 101 may transmit an RTSP M6 response message to the external electronic device 102 in response to the RTSP M6 request message. The external electronic device 102 which receives the RTSP M6 response message may transmit an RTSP M7 request message to the electronic device 101 to inform that the external electronic device 102 is ready to receive the multimedia content. The electronic device 101 may transmit an RTSP M7 response message in response to the RTSP M7 request message, thereby completing the establishment of the WFD session.

After completing operation 1313, the electronic device 101 may transmit streaming data of the multimedia content to the external electronic device 102 through the established WFD session, although this operation is not illustrated in FIG. 13.

FIG. 13 illustrates that the electronic device 101 requests the capability data from the external electronic device 102 through the RTSP M3 request message, the external electronic device 102 transmits the capability data to the electronic device 101 through the RTSP M3 response message, and the electronic device 101 transmits the posture control information to the external electronic device 102 through the RTSP M4 request message. However, this is merely for convenience of explanation. The electronic device 101 may perform the request of the capability data and the transmission of the posture control information by using at least one other message which is distinct from the RTSP M3 request message and the RTSP M4 request message from among the RTSP M1-M7 messages, and the external electronic device 102 may transmit the capability data by using another message which is distinct from the RTSP M3 response message from among the RTSP M1 message to RTSP M7 message.

As described above, the electronic device 101 according to an embodiment may perform transmission of the capability data and the posture control information by using the WFD session establishment procedure, such that an enhanced screen sharing service can be provided.

Figure 14:
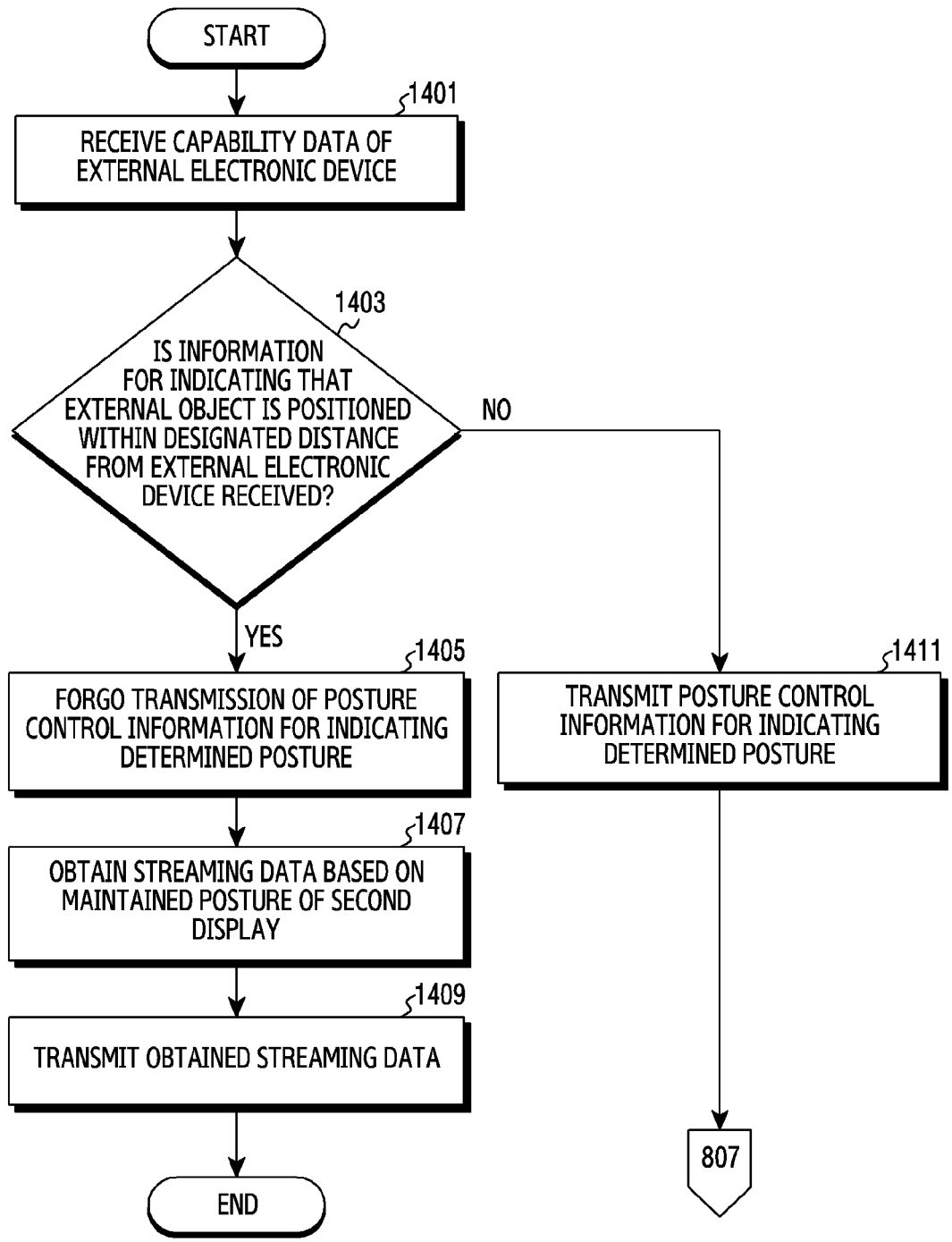
FIG. 14 is a flowchart illustrating a method for forgoing transmission of posture control information according to one or more embodiments.

FIG. 14 is a flowchart illustrating a method for forgoing transmitting posture control information according to one or more embodiments. According to one or more embodiments, this method may be executed by the electronic device 101 shown in FIG. 1 or 2 or the processor 120 of the electronic device 101.

Operations 1401 to 1411 of FIG. 14 may be related to operations 801 and 805 of FIG. 8.

Referring to FIG. 14, in operation 1401, the processor 120 according to an embodiment may receive capability data of the external electronic device 102 from the external electronic device 102. For example, operation 1401 may correspond to operation 801 of FIG. 8.

According to an embodiment, in operation 1403, the processor 120 may determine whether information for indicating that an external object is positioned with a designated distance from the external electronic device 102 is received from the external electronic device 102. For example, the processor 120 may identify whether the information for indicating that the external object is positioned within the designated distance from the external electronic device 102 is received, in order to prevent a damage of the second display caused by the external object positioned on the periphery of the second display of the external electronic device 102, or a damage of the external object caused by change of the posture of the second display. When the external object is positioned within the designated distance from the external electronic device 102, the processor 120 may perform operation 1405, but otherwise, the processor 120 may perform operation 1411.

According to an embodiment, in operation 1405, the processor 120 may forgo or defer transmitting the posture control information for indicating the determined posture of the second display, based on reception of the information for indicating that the external object is positioned within the designated distance from the external electronic device 102. For example, the processor 120 may forgo or defer transmitting the posture control information in order to prevent a damage of the second display caused by the external object positioned on the periphery of the second display of the external electronic device 102, or a damage of the external object caused by change of the posture of the second display.

According to an embodiment, in operation 1407, the processor 120 may obtain the streaming data of the screen including the multimedia content based on the maintained posture of the second display. For example, the processor 120 may obtain the streaming data of the screen including the multimedia content, based on the maintained posture of the second display, in order to display the multimedia content on the second display with high visibility.

According to an embodiment, operation 1409, the processor 120 may transmit the obtained streaming data to the external electronic device 102. The external electronic device 102 may display the multimedia content on the second display based on the obtained streaming data.

According to an embodiment, in operation 1411, the processor 120 may determine the posture of the second display corresponding to the display direction of the multimedia content, based on non-reception of the information for indicating that the external object is positioned within the designated distance from the external electronic device 102, and may transmit the posture control information for indicating the determined posture. The processor 120 may perform operation 807 after performing operation 1411.

As described above, when the external object is positioned on the periphery of the second display of the external electronic device 102, the electronic device 101 according to one or more embodiments can prevent a damage of the external object or a damage of the second display by forgoing changing the posture of the second display of the external electronic device 102.

Figure 15:
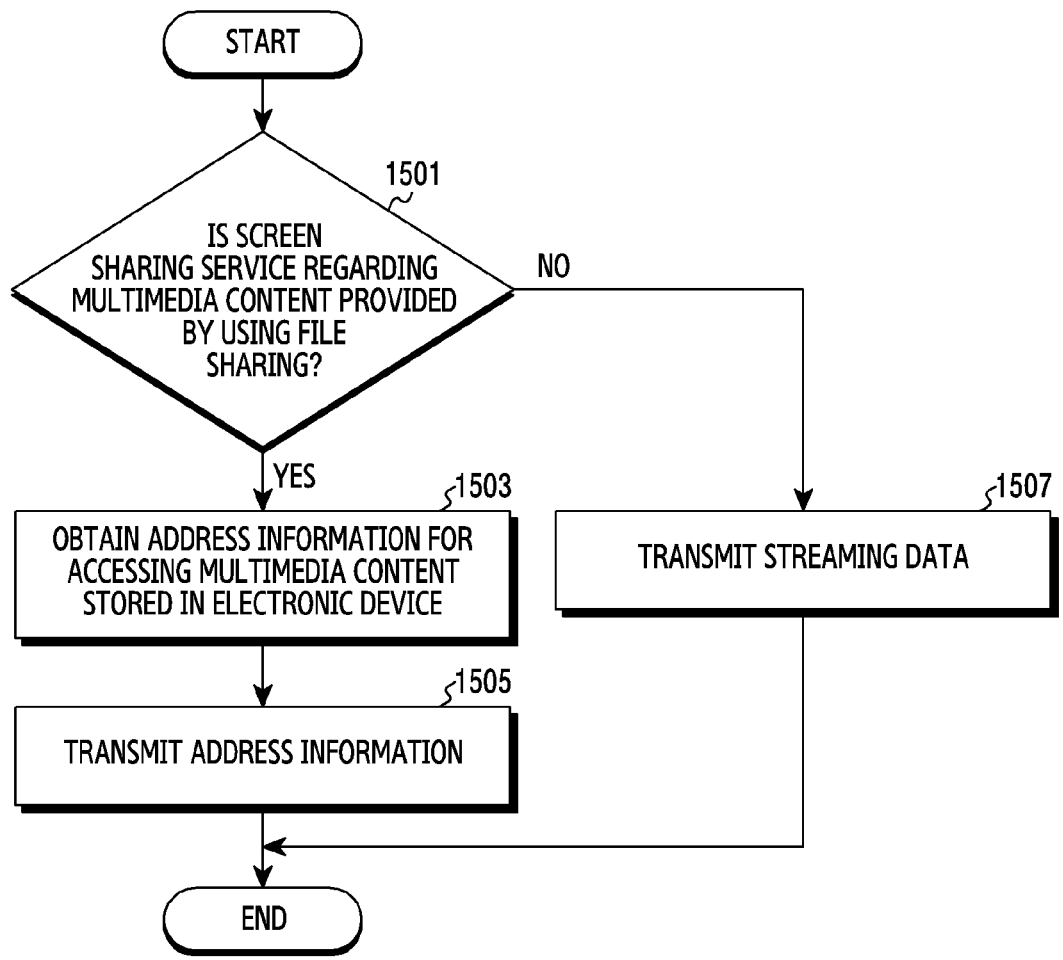
FIG. 15 is a flowchart illustrating a method for transmitting streaming data or address information according to one or more embodiments.

FIG. 15 is a flowchart illustrating a method for transmitting streaming data or address information according to one or more embodiments. According to one or more embodiments, this method may be executed by the electronic device 101 shown in FIG. 1 or 2 or the processor 120 of the electronic device 101.

Referring to FIG. 15, in operation 1501, the processor 120 according to an embodiment may identify whether a screen sharing service regarding a multimedia content is provided by using file sharing. For example, the processor 120 may identify whether an input indicating that the screen sharing service regarding the multimedia content is provided by using the file sharing is received, or may identify whether the electronic device 101 is required to provide the screen sharing service regarding the multimedia content by using the file sharing. When the screen sharing service regarding the multimedia content is provided by using the file sharing, the processor 120 may perform operation 1503, but otherwise, the processor 120 may perform operation 1507.

According to an embodiment, in operation 1503, the processor 120 may obtain address information for accessing the multimedia content stored in the electronic device 101, based on it being identified that the screen sharing service regarding the multimedia content is provided by using the file sharing.

According to an embodiment, in operation 1505, the processor 120 may transmit the address information to the external electronic device 102 to display the multimedia content on the second display. The external electronic device 102 may receive the address information, and may access the multimedia content stored in the electronic device 101 based on the received address information, thereby displaying the multimedia content on the second display.

According to an embodiment, in operation 1507, the processor 120 may transmit streaming data to the external electronic device 102 based on it being identified that the screen sharing service regarding the multimedia content is not provided by using the file sharing. For example, operation 807 may correspond to operation 1507.

As described above, the electronic device 101 according to one or more embodiments can provide an enhanced screen sharing service by adaptively changing the transmission of the streaming data and the transmission of the address information.

Figure 16:
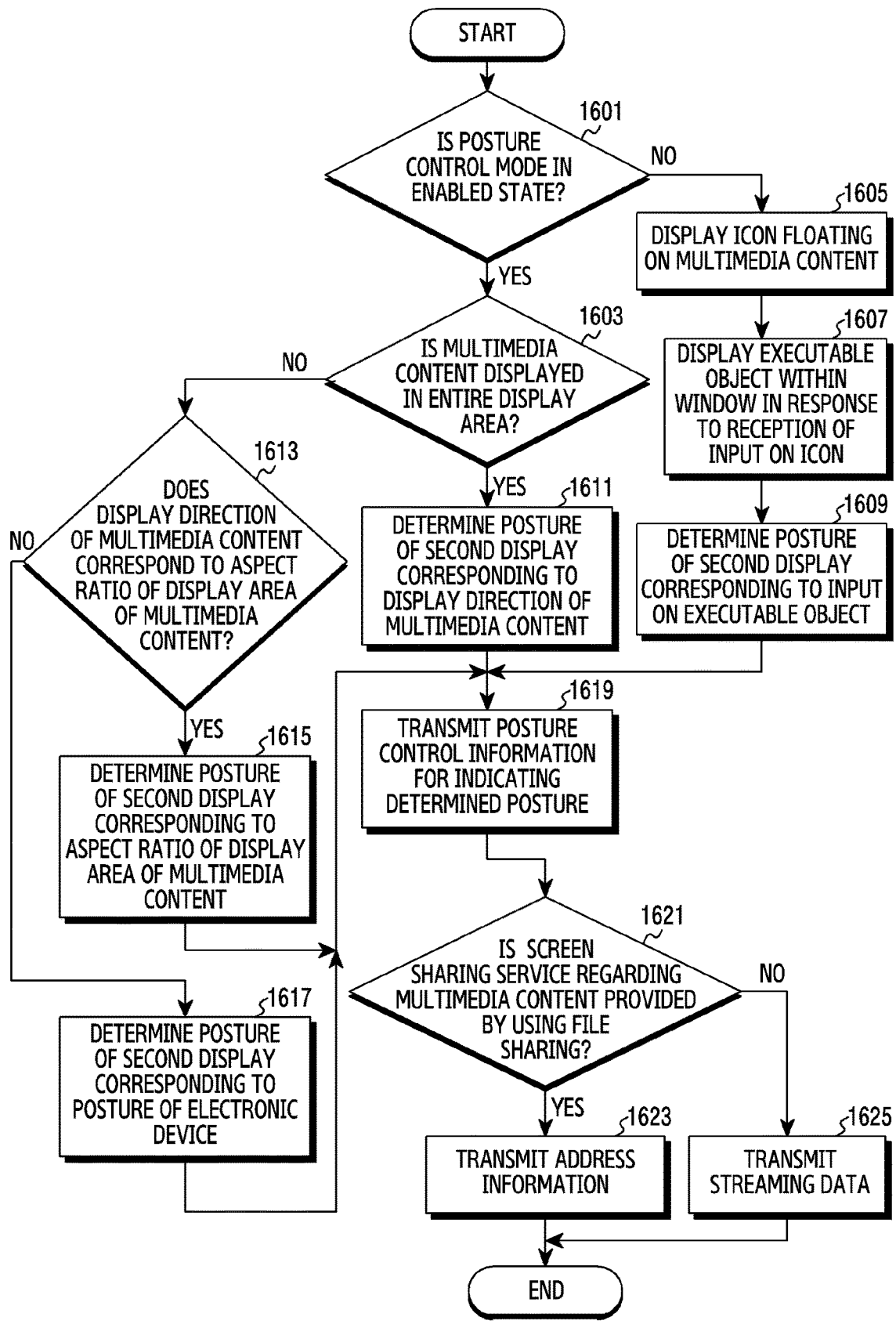
FIG. 16 is a flowchart illustrating a method for providing a screen sharing service according to one or more embodiments.

FIG. 16 is a flowchart illustrating a method for providing a screen sharing service according to one or more embodiments. According to one or more embodiments, this method may be executed by the electronic device 101 shown in FIG. 1 or 2 or the processor 120 of the electronic device 101.

Referring to FIG. 16, in operation 1601, the processor 120 according to an embodiment may identify whether a posture control mode is in an enabled state. When the posture control mode is in the enabled state, the processor 120 may perform operation 1603, and, when the posture control mode is in a disabled state, the processor 120 may perform operation 1605.

According to an embodiment, in operation 1605, the processor 120 may display an icon floating on the multimedia content, based on it being identified that the posture control mode is in the disabled state. For example, operation 1605 may correspond to operation 1009 of FIG. 10.

According to an embodiment, in operation 1607, the processor 120 may display an executable object within a window partially superimposed on the multimedia content in response to an input on the icon being received. For example, operation 1607 may correspond to operation 1011 of FIG. 10.

According to an embodiment, in operation 1609, the processor 120 may determine a posture of the second display corresponding to an input on the executable object. For example, operation 1609 may correspond to operation 1013 of FIG. 10.

According to an embodiment, in operation 1603, the processor 120 may identify whether the multimedia content is displayed within an entire display area of the first display, based on it being identified that the posture control mode is in the enabled state. When it is identified that the multimedia content is displayed in the entire display area, the processor 120 may perform operation 1611, but otherwise, the processor 120 may perform operation 1613.

According to an embodiment, in operation 1611, the processor 120 may determine the posture of the second display corresponding to a display direction of the multimedia content, based on it being identified that the multimedia content is displayed within the entire display area. For example, operation 1611 may correspond to operation 803 of FIG. 8.

According to an embodiment, in operation 1613, the processor 120 may identify whether the display direction of the multimedia content corresponds to an aspect ratio of a display area of the multimedia content, based on it being identified that the multimedia content is displayed within a partial area. When it is identified that the display direction of the multimedia content corresponds to the aspect ratio of the display area of the multimedia content, the processor 120 may perform operation 1615, but otherwise, the processor 120 may perform operation 1617.

According to an embodiment, in operation 1615, the processor 120 may determine the posture of the second display corresponding to the aspect ratio of the display area of the multimedia content, based on it being identified that the display direction of the multimedia content corresponds to the aspect ratio of the display area of the multimedia content.

According to an embodiment, in operation 1617, the processor 120 may determine the posture of the second display corresponding to a posture of the electronic device 101, based on it being identified that the display direction of the multimedia content does not correspond to the aspect ratio of the display area of the multimedia content.

According to an embodiment, in operation 1619, the processor 120 may transmit posture control information for indicating the determined posture to the external electronic device 102.

According to an embodiment, in operation 1621, after transmitting the posture control information, the processor 120 may identify whether a screen sharing service regarding the multimedia content is provided by using file sharing. When the screen sharing service regarding the multimedia content is provided by using the file sharing, the processor 120 may perform operation 1623, but otherwise, the processor 120 may perform operation 1625.

According to an embodiment, in operation 1623, the processor 120 may transmit address information for the external electronic device 102 to access the multimedia content stored in the electronic device 101 to the external electronic device 102, based on it being identified that the screen sharing service regarding the multimedia content is provided by using the file sharing.

According to an embodiment, in operation 1625, the processor 120 may transmit streaming data of a screen including the multimedia content to the external electronic device 102, based on it being identified that the screen sharing service regarding the multimedia content is not provided by using the file sharing.

As described above, the electronic device 101 according to one or more embodiments may provide the screen sharing service in various methods according to contexts, such that an intuitive screen sharing service can be provided.

Figure 17:
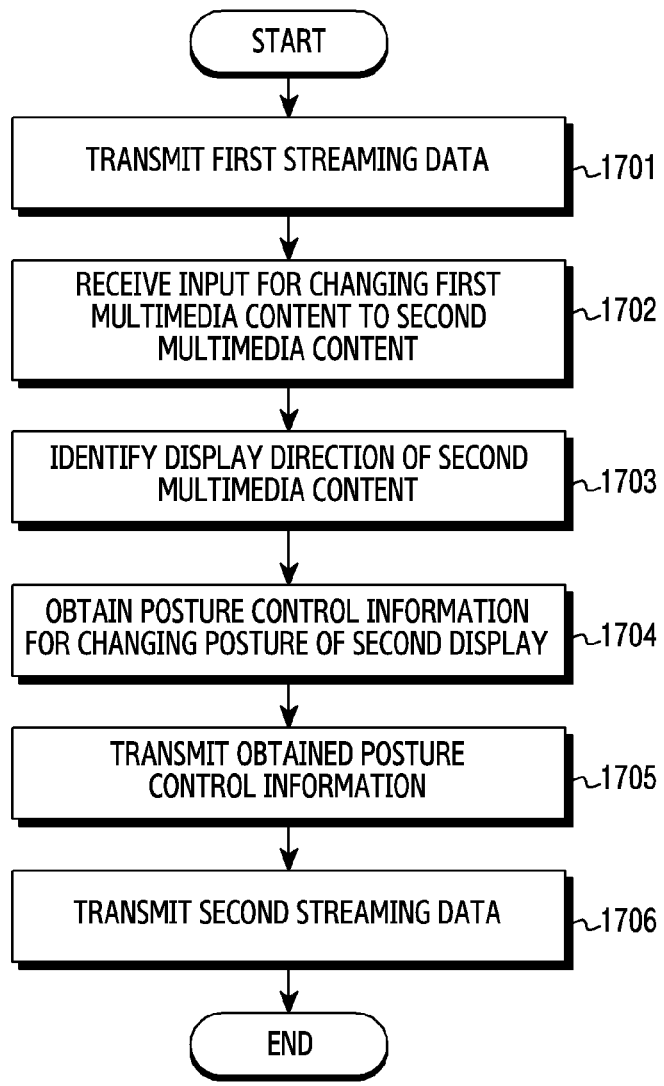
FIG. 17 is a flowchart illustrating a method for transmitting posture control information according to a change of a multimedia content according to one or more embodiments.

FIG. 17 is a flowchart illustrating a method for transmitting posture control information according to change of a multimedia content according to one or more embodiments. According to one or more embodiments, this method may be executed by the electronic device 101 shown in FIG. 1 or 2 or the processor 120 of the electronic device 101.

Referring to FIG. 17, in operation 1701, the processor 120 according to an embodiment may transmit first streaming data of a screen including a first multimedia content to the external electronic device 102 to display the first multimedia content on the second display of the external electronic device 102, while displaying the first multimedia content on the first display in a first display direction.

According to an embodiment, in operation 1702, the processor 120 may receive an input for changing the first multimedia content displayed on the first display to a second multimedia content. For example, the input may refer to an input of changing the first multimedia content to the second multimedia content which is the next multimedia content of the first multimedia content.

According to an embodiment, in operation 1703, the processor 120 may identify a display direction of the second multimedia content, based on the reception of the input. For example, the processor 120 may identify the display direction of the second multimedia content according to the method exemplified through descriptions of FIG. 2 or descriptions of FIG. 8.

According to an embodiment, in operation 1704, when the identified display direction is a second display direction distinct from the first display direction, the processor 120 may obtain posture control information for changing the posture of the second display, based on the second display direction.

According to an embodiment, in operation 1705, the processor 120 may transmit the posture control information to the external electronic device 102. The external electronic device 102 may change the posture of the second display from the posture of the second display while displaying the first multimedia content to a posture identified based on the posture control information, based on the posture control information.

According to an embodiment, in operation 1706, the processor 120 may transmit second streaming data of a screen including the second multimedia content displayed on the first display to the external electronic device 102 in order to display the second multimedia content on the second display having the posture changed based on the posture control information.

When the identified display direction is the first display direction, the processor 120 may forgo the transmission of the posture control information to maintain the posture of the second display displaying the first multimedia content based on the first streaming data, and may transmit the second streaming data of the second multimedia content displayed on the first display to the external electronic device 102 in order to display the second multimedia content on the second display having the maintained posture.

According to one or more embodiments as described, a method executed in an electronic device (for example, the electronic device 101) including a communication circuit (for example, the communication circuit 191) and a first display (for example, the display 161) may include: while displaying a multimedia content on the first display, receiving capability data of an external electronic device for indicating that change of a posture of a second display of the external electronic device is available, by using the communication circuit; based on the reception of the capability data, determining a posture of the second display corresponding to a display direction of the multimedia content; transmitting posture control information for indicating the determined posture to the external electronic device by using the communication circuit; and transmitting streaming data of a screen including the multimedia content displayed on the first display to the external electronic device by using the communication circuit in order to display the screen including the multimedia content on the second display having the posture determined based on the posture control information.

According to one or more embodiments, a method executed in an electronic device (for example, the electronic device 101) including a communication circuit (for example, the communication circuit 191) and a first display (for example, the display 161) may include: while displaying a first multimedia content on the first display in a first display direction, transmitting first streaming data of a screen including the first multimedia content to an external electronic device by using the communication circuit in order to display the first multimedia content on a second display of the external electronic device; receiving an input for changing the first multimedia content displayed on the first display to a second multimedia content; identifying a display direction of the second multimedia content based on the reception of the input; when the identified display direction is a second display direction which is distinct from the first display direction, obtaining posture control information for changing a posture of the second display based on the second display direction; transmitting the posture control information to the external electronic device by using the communication circuit; and transmitting second streaming data of a screen including the second multimedia content displayed on the first display to the external electronic device by using the communication circuit in order to display the second multimedia content on the second display having the posture changed based on the posture control information.

A non-transitory computer readable storage medium according to one or more embodiments may store one or more programs, wherein the one or more programs include instructions that, when being executed by one or more processors of an electronic device (for example, the electronic device 101) having a communication circuit (for example, the communication circuit 191) and a first display (for example, the display 161), cause the electronic device to: while displaying a multimedia content on the first display, receive capability data of an external electronic device for indicating that change of a posture of a second display of the external electronic device is available, by using the communication circuit; based on the reception of the capability data, determine a posture of the second display corresponding to a display direction of the multimedia content; transmit posture control information for indicating the determined posture to the external electronic device by using the communication circuit; and transmit streaming data of a screen including the multimedia content displayed on the first display to the external electronic device by using the communication circuit in order to display the screen including the multimedia content on the second display having the posture determined based on the posture control information.

A non-transitory computer readable storage medium according to one or more embodiments may store one or more programs, wherein the one or more programs include instructions that, when being executed by one or more processors of an electronic device (for example, the electronic device 101) having a communication circuit (for example, the communication circuit 191) and a first display (for example, the display 161), cause the electronic device to: while displaying a first multimedia content on the first display in a first display direction, transmit first streaming data of a screen including the first multimedia content to an external electronic device by using the communication circuit in order to display the first multimedia content on a second display of the external electronic device; receive an input for changing the first multimedia content displayed on the first display to a second multimedia content; identify a display direction of the second multimedia content based on the reception of the input; when the identified display direction is a second display direction which is distinct from the first display direction, obtain posture control information for changing a posture of the second display based on the second display direction; transmit the posture control information to the external electronic device by using the communication circuit; and transmit second streaming data of a screen including the second multimedia content displayed on the first display to the external electronic device by using the communication circuit in order to display the second multimedia content on the second display having the posture changed based on the posture control information.

The electronic device, the method, and the computer readable medium according to one or more embodiments transmit posture control information for controlling the posture of the external electronic device, which obtains data from the electronic device, to the external electronic device, such that an enhanced screen sharing service can be provided.

The effect achieved by the disclosure is not limited to that mentioned above, and other effects that are not mentioned above may be clearly understood to those skilled in the art based on the description provided above.

Methods based on the claims or the embodiments disclosed in the disclosure may be implemented in hardware, software, or a combination of both.

When implemented in software, a computer readable storage medium for storing one or more programs (software modules) may be provided. The one or more programs stored in the computer readable storage medium are configured for execution performed by one or more processors in an electronic device. The one or more programs include instructions for allowing the electronic device to execute the methods based on the claims or the embodiments disclosed in the disclosure.

The program (the software module or software) may be stored in a random access memory, a non-volatile memory including a flash memory, a read only memory (ROM), an electrically erasable programmable read only memory (EEPROM), a magnetic disc storage device, a compact disc-ROM (CD-ROM), digital versatile discs (DVDs) or other forms of optical storage devices, and a magnetic cassette. Alternatively, the program may be stored in a memory configured in combination of all or some of these storage media. In addition, the configured memory may be plural in number.

Further, the program may be stored in an attachable storage device capable of accessing the electronic device through a communication network such as the Internet, an Intranet, a local area network (LAN), a wide LAN (WLAN), or a storage area network (SAN) or a communication network configured by combining the networks. The storage device may access via an external port to a device which performs the embodiments of the disclosure. In addition, an additional storage device on a communication network may access to a device which performs the embodiments of the disclosure.

In the above-described specific embodiments of the disclosure, elements included in the disclosure are expressed in singular or plural forms according to specific embodiments. However, singular or plural forms are appropriately selected according to suggested situations for convenience of explanation, and the disclosure is not limited to a single element or plural elements. An element which is expressed in a plural form may be configured in a singular form or an element which is expressed in a singular form may be configured in plural number.

While the disclosure has been shown and described with reference to certain preferred embodiments thereof, it will be understood by those skilled in the art that various changes in form and details may be made therein without departing from the spirit and scope of the disclosure as defined by the appended claims. Therefore, the scope of the disclosure is defined not by the detailed description of the disclosure but by the appended claims, and all differences within the scope will be construed as being included in the disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
    at least one memory configured to store instructions;
    a first display;
    a communication circuit; and
    at least one processor configured to:
        while displaying a multimedia content on the first display, receive, via the communication circuit, capability data of an external electronic device from the external electronic device, the capability data indicating an availability to change a position of a second display of the external electronic device;
        based on the capability data, determine a position of the second display to be controlled to correspond to a display direction of the multimedia content being displayed on the first display;
        transmit, via the communication circuit, posture control information indicating the determined position of the second display to the external electronic device, wherein the external electronic device controls a motor of the external electronic device to change the position of the second display based on the posture control information; and
        transmit, via the communication circuit, streaming data corresponding to the multimedia content displayed on the first display to the external electronic device, wherein the streaming data enables the external electronic device to display the multimedia content on the second display having the position indicated by the posture control information.

2. The electronic device of claim 1, wherein the at least one processor is configured to:
    while displaying the multimedia content on the first display, detect an input of requesting to display the multimedia content on the second display;
    based on the detected input, identify whether the multimedia content is displayed on an entire display area of the first display; and
    based on it being identified that the multimedia content is displayed on the entire display area of the first display, determine the position of the second display to correspond to the display direction of the multimedia content.

3. The electronic device of claim 2, further comprising a sensor,
    wherein the at least one processor is further configured to determine the position of the second display to correspond to a position of the electronic device that is identified through the sensor, based on it being identified that the multimedia content is displayed on a partial display area of the first display.

4. The electronic device of claim 1, wherein the at least one processor is configured to:
    based on the capability data, determine whether a position control mode in which the electronic device controls the position of the second display is in an enabled state; and
    based on it being identified that the position control mode is in the enabled state, determine the position of the second display to correspond to the display direction of the multimedia content.

5. The electronic device of claim 4, wherein the at least one processor is further configured to:
    based on it being identified that the position control mode is in a disabled state, bypass determining the position of the second display to correspond to the display direction of the multimedia content, and to display an icon floating on the multimedia content while displaying the multimedia content on the first display;

in response to an input on the icon being received, display an executable object for determining the position of the second display within a window partially superimposed on the multimedia content; and in response to an input on the executable object being received, determine the position of the second display to correspond to the input on the executable object.

6. The electronic device of claim 1, wherein the at least one processor is configured to:

while displaying the multimedia content on the first display, receive an input for designating a partial area of a display area of the multimedia content;

in response to the received input, determine a display direction of a part of the multimedia content included in the partial area; and determine the position of the second display to correspond to the display direction of the part of the multimedia content.

7. The electronic device of claim 6, wherein the at least one processor is configured to:

up-scale the part of the multimedia content based on a size of a display area of the second display;

obtain the streaming data based on the up-scaled part of the multimedia content; and transmit, via the communication circuit, the streaming data to the external electronic device.

8. The electronic device of claim 1, wherein the posture control information is transmitted from the electronic device to the external electronic device to set the position of the second display to a first designated position or a second designated position, based on control of the motor of the external electronic device connected with the second display.

9. The electronic device of claim 1, wherein the processor is configured to:

transmit, via the communication circuit, a signal requesting the capability data of the external electronic device to the external electronic device; and in response to the signal, receive, via the communication circuit, the capability data from the external electronic device.

10. The electronic device of claim 9, wherein the communication circuit comprises a wireless fidelity (WiFi) communication circuit, wherein the signal requesting the capability data is transmitted from the electronic device to the external electronic device through an RTSP M3 request message, wherein the capability data is received at the electronic device from the external electronic device through an RTSP M3 response message, and wherein the posture control information is transmitted to the external electronic device through an RTSP M4 request message.

11. The electronic device of claim 1, wherein the at least one processor is further configured to, when the electronic device provides a screen sharing service regarding the multimedia content based on DIGITAL LIVING NETWORK ALLIANCE (DLNA), transmit, via the communication circuit, address information for the external electronic device to access the multimedia content stored in the electronic device to the external electronic device, instead of transmitting, via the communication circuit, the streaming data.

12. The electronic device of claim 1, wherein the position of a second display is based on a posture that the second display is oriented.

13. An electronic device comprising:

at least one memory configured to store instructions;

a first display;

a communication circuit; and at least one processor is configured to:

while displaying a first multimedia content on the first display in a first display direction, transmit, via the communication circuit, first streaming data corresponding to the first multimedia content to an external electronic device, the first streaming data enables the external electronic device to display the first multimedia content on a second display of the external electronic device;

receive an input for changing the first multimedia content displayed on the first display to a second multimedia content representing a region of interest of the first multimedia content;

identify a display direction of the second multimedia content based on an aspect ratio of the second multimedia content selected by the received input;

when the identified display direction is a second display direction that is distinct from the first display direction, obtain posture control information for changing a position of the second display based on the second display direction;

transmit, via the communication circuit, the posture control information to the external electronic device, wherein the external electronic device controls a motor of the external electronic device to change the position of the second display based on the posture control information; and transmit, via the communication circuit, second streaming data corresponding to the second multimedia content displayed on the first display to the external electronic device, wherein the second streaming data enables the external electronic device to display the second multimedia content on the second display having the position of indicated by the posture control information.

14. The electronic device of claim 13, wherein the at least one processor is further configured to:

when the identified display direction is the first display direction, forgo transmitting the posture control information to maintain the position of the second display displaying the first multimedia content based on the first streaming data; and transmit, via the communication circuit, the second streaming data of the second multimedia content displayed on the first display to the external electronic device enabling the external electronic device to display the second multimedia content on the second display and maintaining the position.

15. The electronic device of claim 14, wherein the at least one processor is configured to:

in response to the received input, identify whether to display the second multimedia content on an entire display area of the first display; and in response to it being identified that the second multimedia content is displayed on the entire display area of the first display, obtain the posture control information based on the second display direction.

16. The electronic device of claim 15, further comprising a sensor,
wherein the at least one processor is further configured to obtain the posture control information for changing the position of the second display, based on a position of the electronic device identified through the sensor, in response to it being identified that the second multimedia content is displayed on a partial display area of the first display.

17. The electronic device of claim 13, wherein the at least one processor is further configured to, when a position control mode in which the electronic device controls the position of the second display is in a disabled state, forgo transmitting the posture control information to maintain the position of the second display displaying the first multimedia content based on the first streaming data, independently from that the identified display direction is the second display direction.

18. The electronic device of claim 17, wherein the processor is further configured to:
when the position control mode is in the disabled state, display an icon floating on the second multimedia content while displaying the second multimedia content on the first display;
in response to an input on the icon being received, display an executable object for determining the position of the second display within a window partially superimposed on the second multimedia content; and
in response to an input on the executable object being received, obtain the posture control information for changing the position of the second display, based on a direction indicated by the input on the executable object.

19. The electronic device of claim 13, wherein the posture control information is configured to cause the second display to be rotated by 90 degrees.

20. A method executed in an electronic device comprising a communication circuit and a first display, the method comprising:
while displaying a multimedia content on the first display, receiving, via the communication circuit, capability data of an external electronic device from the external electronic device, the capability data indicating an availability to change a position of a second display of the external electronic device;
based on the capability data, determining a position of the second display to be controlled to correspond to a display direction of the multimedia content being displayed on the first display;
transmitting, via the communication circuit, posture control information indicating the determined position of the second display to the external electronic device, wherein the external electronic device controls a motor of the external electronic device to change the position of the second display based on the posture control information; and
transmitting, via the communication circuit, streaming data corresponding to the multimedia content displayed on the first display to the external electronic device, wherein the streaming data enables the external electronic device to display the multimedia content on the second display having the position indicated by the posture control information.

21. A non-transitory computer readable storage medium that stores one or more programs, wherein the one or more programs comprise instructions that, when executed by one or more processors of an electronic device that includes a first display and a communication circuit, cause the electronic device to:
while displaying a multimedia content on the first display, receive, via the communication circuit, capability data of an external electronic device from the external electronic device, the capability data indicating an availability to change a position of a second display of the external electronic device;
based on the capability data, determine a position of the second display to be controlled to correspond to a display direction of the multimedia content being displayed on the first display;
transmit, via the communication circuit, posture control information indicating the determined position of the second display to the external electronic device, wherein the external electronic device controls a motor of the external electronic device to change the position of the second display based on the posture control information; and
transmit, via the communication circuit, streaming data corresponding to the multimedia content displayed on the first display to the external electronic device, wherein the streaming data enables the external electronic device to display the multimedia content on the second display having the position indicated by the posture control information.

* * * * *